(12) United States Patent
Hamada et al.

(10) Patent No.: US 6,339,572 B1
(45) Date of Patent: Jan. 15, 2002

(54) RECORDING APPARATUS, RECORDING METHOD, PLAYBACK APPARATUS, PLAYBACK METHOD, RECORDING/PLAYBACK APPARATUS, RECORDING/PLAYBACK METHOD, RECORDING MEDIUM AND PRESENTATION MEDIUM

(75) Inventors: Toshiya Hamada, Saitama; Yasushi Fujinami, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/175,135

(22) Filed: Oct. 19, 1998

(30) Foreign Application Priority Data

Oct. 21, 1997 (JP) .............................. 9-288179
Feb. 27, 1998 (JP) ............................ 10-046856

(51) Int. Cl.$^7$ ................................................ G11B 7/00
(52) U.S. Cl. ................... 369/53.2; 369/47.1; 369/53.11
(58) Field of Search .......................... 369/47.1, 47.11, 369/47.12, 47.13, 47.14, 47.21, 53.1, 53.11, 53.15, 53.2, 53.22, 53.31, 53.37, 53.41, 59.1, 59.25

(56) References Cited

U.S. PATENT DOCUMENTS 5,119,291 A * 6/1992 Flannagan et al. ........ 369/32 X
6,023,705 A * 2/2000 Bellinger et al. ......... 369/34 X

* cited by examiner

*Primary Examiner*—Muhammad Edun
(74) *Attorney, Agent, or Firm*—Frommer Lawrence & Haug LLP; William S. Frommer

(57) ABSTRACT

This invention provides a recording apparatus, a recording method, a playback apparatus, a playback method, a recording/playback apparatus, a recording/playback method, a recording medium and a presentation medium. In this invention, information on the album is recorded only into a chief disc, one of the discs composing the album. The other discs simply include an identification of the chief disc. Accordingly it is possible to allow a plurality of recording media to be handled as a unit with ease and to allow each of the recording media to pertain to a plurality of such units.

56 Claims, 30 Drawing Sheets

FIG. 1

```
/---VOLUME.TOC              |---|
 |                          |   |---MPEGAV
 |---ALBUM.STR              |   |   |
 |                          |   |   |---STREAMS-001
 |---PROGRAM                |   |   |   |
 |   |                      |   |   |   |---CHUNK_0001.MPEG2
 |   |---PROGRAM_001.PGI    |   |   |   |
 |   |                      |   |   |   |---CHUNK_0002.MPEG2
 |   |---PROGRAM_002.PGI    |   |   |   |
 |   |    :                 |   |   |   |---CHUNK_0003.MPEG2
 |   |    :                 |   |   |   |
 |   |---PROGRAM_$$$.PGI    |   |   |---STREAMS-002
 |   |    :                 |   |   |   |
 |   |                      |   |   |   |---CHUNK_0011.MPEG2
 |---TITLE                  |   |   |   |
 |   |                      |   |   |   |---CHUNK_0012.MPEG2
 |   |---TITLE_001.VDR      |   |   |   |
 |   |                      |   |   |   |    :
 |   |---TITLE_002.VDR      |   |   |        :
 |   |                      |   |   |
 |   |---TITLE_003.VDR      |   |   |
 |   |    :                 |   |   |---STREAMS_&&&
 |   |    :                 |   |   |   |
 |   |    :                 |   |   |   |---CHUNK_%%%%.MPEG2
 |   |---TITLE_###.VDR      |   |   |        :
 |   |    :                 |   |   |
 |                          |   |---SCRIPT
 |---CHUNKGROUP             |   |
 |   |                      |   |---PICTURES
 |   |---CHUNKGROUP_001.CGIT|   |   |
 |   |                      |   |   |---TITLE_001.JACKET
 |   |---CHUNKGROUP_002.CGIT|   |   |
 |   |    :                 |   |   |---TITLE_001.THUMB
 |   |    :                 |   |   |
 |   |                      |   |   |---PROGRAM_002.THUMB
 |   |---CHUNKGROUP_@@@.CGIT|   |        :
 |   |    :                 |   |
 |                          |   |---GRAPHICS
 |---CHUNK                  |
 |   |                      |
 |   |---CHUNK_0001.ABST    |
 |   |                      |
 |   |---CHUNK_0002.ABST    |
 |   |    :                 |
 |   |    :                 |
 |   |                      |
 |   |---CHUNK_%%%%.ABST    |
 |        :                 |
 |_____|
```

FIG. 2

| Syntax | Number of Bits | Mnemonic |
|---|---|---|
| VOLUME.TOC { | | |
|     file_type_id | 8*16 | char[16] |
|     volume_information() | | |
|     text_block() | | |
| } | | |

FIG. 3

| Syntax | Number of Bits | Mnemonic |
|---|---|---|
| volume_information() { | | |
|     volume_attribute() | | |
|     resume() | | |
|     volume_rating() | | |
|     write_protect() | | |
|     play_protect() | | |
|     recording_timer() | | |
| } | | |

FIG. 4

| Syntax | Number of Bits | Mnemonic |
|---|---|---|
| volume_attribute() { | | |
|     volume_attribute_length | 32 | uimsbf |
|     vdr_version | 4*4 | bcd |
|     reserved | 6 | bslbf |
|     title_playback_mode_flag | 1 | bslbf |
|     program_playback_mode_flag | 1 | bslbf |
|     volume_play_time() | 4*8 | bcd |
|     update_time_count() | 32 | uimsbf |
|     maker_id | 8*16 | char[16] |
|     model_code | 8*16 | char[16] |
|     POSID | 32 | bslbf |
| } | | |

FIG. 5

| Syntax | Number of Bits | Mnemonic |
|---|---|---|
| resume() { | | |
|     resume_length | 32 | uimsbf |
|     reserved    // for byte alignment | 3 | bslbf |
|     resume_switch | 1 | bit |
|     reserved | 4 | bslbf |
|     number_of_records | 4 | uimsbf |
|     reserved    // for byte alignment | 7 | bslbf |
|     resume_auto_execute_time_flag | 1 | bit |
|     resume_auto_execute_time() | 4*14 | bcd |
|     reserved | 4 | bslbf |
|     resume_auto_execute_record_number | 4 | uimsbf |
|     for(i=0;i<number_of_records;i++) { | | |
|         resume_mode_flag | 4 | bslbf |
|         object_type | 4 | bslbf |
|         linked_record_number | 4 | uimsbf |
|         number_of_times | 16 | uimsbf |
|         resume_updated_time() | 4*14 | bcd |
|         switch(object_type) { | | |
|           case title: | | |
|             title_number | 16 | uimsbf |
|             title_local_time_stamp | 64 | uimsbf |
|             break; | | |
|           case program: | | |
|             program_number | 16 | uimsbf |
|             program_local_time_stamp | 64 | uimsbf |
|             break; | | |
|           case program_bind: | | |
|             program_bind_number | 16 | uimsbf |
|             program_order | 16 | uimsbf |
|             program_number | 16 | uimsbf |
|             program_local_time_stamp | 64 | uimsbf |
|             break; | | |
|           case play_item: | | |
|             play_item_number | 16 | uimsbf |
|             play_item_local_time_stamp | 64 | uimsbf |
|             break | | |
|         } | | |
|     } | | |
| } | | |

F I G. 6

| Syntax | Number of Bits | Mnemonic |
|---|---|---|
| volume_rating() { | | |
|   volume_rating_id | 8*16 | char[16] |
|   volume_rating_length | 32 | uimsbf |
|   reserved | 6 | bslbf |
|   volume_rating_type | 2 | bslbf |
|   volume_rating_password | 128 | bslbf |
|   switch (volume_rating_type) { | | |
|     case age_limited: | | |
|       number_of_rating | 8 | uimsbf |
|       for (i=0;i<number_of_rating;i++) { | | |
|         country_code_for_rating | 24 | bslbf |
|         age_for_volume_rating | 8 | uimsbf |
|       } | | |
|       break; | | |
|     case CARA: | | |
|       reserved | 4 | bslbf |
|       CARA_category | 4 | bslbf |
|       reserved | 24 | bslbf |
|       break; | | |
|     case RSAC: | | |
|       reserved | 4 | bslbf |
|       RSAC_category | 4 | bslbf |
|       reserved | 4 | bslbf |
|       RSAC_level | 4 | bslbf |
|       reserved | 16 | bslbf |
|       break; | | |
|   } | | |
| } | | |

FIG. 7

| Syntax | Number of Bits | Mnemonic |
|---|---|---|
| write_protect() { | | |
|     write_protect_length | 32 | uimsbf |
|     volume_write_protect_level | 4 | uimsbf |
|     password_enable_flag | 1 | bslbf |
|     append_only_flag | 1 | bslbf |
|     expiration_time_enable_flag | 1 | bslbf |
|     number_of_times_enable_flag | 1 | bslbf |
|     password_for_volume_write_protect | 128 | bslbf |
|     reserved | 8 | bslbf |
|     write_protect_set_time() | 56 | bcd |
|     reserved | 8 | bslbf |
|     write_protect_expiration_time() | 56 | bcd |
|     number_of_times | 16 | uimsbf |
| } | | |

FIG. 8

| Syntax | Number of Bits | Mnemonic |
|---|---|---|
| play_protect() { | | |
|     play_protect_length | 32 | uimsbf |
|     volume_play_protect_flag | 2 | bslbf |
|     reserved | 2 | bslbf |
|     password_enable_flag | 1 | bslbf |
|     reserved | 1 | bslbf |
|     expiration_time_enable_flag | 1 | bslbf |
|     number_of_times_enable_flag | 1 | bslbf |
|     password_for_volume_play_protect | 128 | bslbf |
|     reserved | 8 | bslbf |
|     play_protect_set_time() | 56 | bcd |
|     reserved | 8 | bslbf |
|     play_protect_expiration_time() | 56 | bcd |
|     number_of_times | 16 | uimsbf |
| } | | |

FIG. 9

| Syntax | Number of Bits | Mnemonic |
|---|---|---|
| recording_timer() { | | |
|     recording_timer_length | | |
|     recording_timer_flag | | |
|     number_of_entry | | |
|     for(i=0;i<number_of_entry;i++) { | | |
|         date_and_time | | |
|         channel | | |
|         program | | |
|         : | | |
|     } | | |
| } | | |

FIG. 10

| Syntax | Number of Bits | Mnemonic |
|---|---|---|
| text_block() { | | |
|     text_block_length | 32 | uimsbf |
|     number_of_language_sets | 8 | uimsbf |
|     number_of_text_items | 16 | uimsbf |
|     for(i=0;i<number_of_language_sets;i++) { | | |
|         language_set() | | |
|     } | | |
|     for(i=0;i<number_of_text_items;i++) { | | |
|         text_item() | | |
|     } | | |
| } | | |

FIG. 11

| Syntax | Number of Bits | Mnemonic |
|---|---|---|
| language_set() { | | |
|     reserved | 8 | bslbf |
|     language_code | 24 | bslbf |
|     character_set_type | 8 | bslbf |
|     number_of_language_set_names | 8 | uimsbf |
|     for(i=0;i<number_of_language_set_names;i++) { | | |
|         character_set_type_for_name | 8 | bslbf |
|         language_set_name_length | 8 | uimsbf |
|         language_set_name | 8*language_set_name_length | bslbf |
|     } | | |
| } | | |

FIG. 12

| Syntax | Number of Bits | Mnemonic |
|---|---|---|
| text_item() { | | |
|    text_item_length | 16 | uimsbf |
|    text_item_id | 16 | uimsbf |
|    text_item_sub_id | 16 | uimsbf |
|    flags | 8 | bslbf |
|    number_of_used_language_sets | 8 | uimsbf |
|    //loop for each language set | | |
|    for(i=0;i<number_of_used_language_sets;i++) { | | |
|       language_set_id | 8 | uimsbf |
|       reserved | 4 | bslbf |
|       text_string_length | 16 | uimsbf |
|       text_string | 8*text_string_length | bslbf |
|       bitmap() | | |
|    } | | |
|    stuffing_bytes | 8*n | bslbf |
| } | | |

FIG. 13

| Syntax | Number of Bits | Mnemonic |
|---|---|---|
| ALBUM.STR{ | | |
|    file_type_id | 8*16 | char[16] |
|    album() | | |
|    text_block() | | |
| } | | |

FIG. 14

| Syntax | Number of Bits | Mnemonic |
|---|---|---|
| album() { | | |
|     album_length | 32 | uimsbf |
|     reserved | 6 | bslbf |
|     volume_status | 1 | bslbf |
|     if (volume_status== "1b" ) { | | |
|         chief_volume_flag | 1 | bslbf |
|     } else { | | |
|         reserved | 1 | "0" |
|     } | | |
|     if (volume_status== "1b" ) { | | |
|         if (chief_volume_flag== "1b" ) { | | |
|             reserved | 6 | bslbf |
|             album_type | 2 | bslbf |
|             albim_id | 128 | bslbf |
|             number_of_discs_in_album | 16 | uimsbf |
|             number_of_volumes_in_album | 16 | uimsbf |
|             for (i=0;i<number_of_volumes_in_album;i++) { | | |
|                 disc_id_for_album_member | 128 | bslbf |
|                 volume_id_for_album_member | 128 | bslbf |
|                 title_offset_number | 16 | uimsbf |
|             } | | |
|             reserved_for_program_bind | 8 | bslbf |
|             number_of_program_binds | 8 | uimsbf |
|             for (i=0;i<number_of_program_binds;i++) { | | |
|                 number_of_program_in_this_program_bind | 16 | uimsbf |
|                 for(i=0;i<number_of_programs_in_this_program_bind;i++) { | | |
|                     disc_id_for_program_bind_member | 128 | uimsbf |
|                     volume_id_for_program_bind_member | 128 | uimsbf |
|                     program_number | 16 | uimsbf |
|                 } | | |
|             } | | |
|         }else{            //chief_volume_flag== "0b" | | |
|             chief_disc_id | 128 | uimsbf |
|             chief_volume_id | 128 | uimsbf |
|             (album_id | 128 | bslbf |
|         } | | |
|     } | | |
| } | | |

FIG. 15

| Syntax | Number of Bits | Mnemonic |
|---|---|---|
| TITLE_###. VDR{ | | |
|     file_type_id | 8*16 | char [16] |
|     title_info() | | |
|     text_block() | | |
| } | | |

FIG. 16

| Syntax | Number of Bits | Mnemonic |
|---|---|---|
| title_info() { | | |
|     title_info_length | 32 | uimsbf |
|     flags_for_title | 32 | bslbf |
|     cgit_file_id | 16 | uimsbf |
|     title_start_chunk_group_time_stamp | 64 | uimsbf |
|     title_end_chunk_group_time_stamp | 64 | uimsbf |
|     title_playback_time() | 32 | bcd |
|     reserved | 32 | bslbf |
|     number_of_marks | 16 | uimsbf |
|     for (i=0;i<number_of_marks;i++) { | | |
|         reserved | 4 | bslbf |
|         mark_type | 4 | bslbf |
|         mark_chunk_group_time_stamp | 64 | uimsbf |
|     } | | |
|     stuffing_bytes | 8*n | bslbf |
| } | | |

FIG. 17

| Syntax | Number of Bits | Mnemonic |
|---|---|---|
| PROGRAM_$$$.PGI { | | |
|     file_type_id | 8*16 | char[16] |
|     program() | | |
|     text_block() | | |
| } | | |

FIG. 18

| Syntax | Number of Bits | Mnemonic |
|---|---|---|
| program() { | | |
|     program_length | 32 | uimsbf |
|     flags_for_program | 32 | bslbf |
|     program_status | 4 | bslbf |
|     program_playback_time() | 32 | bcd |
|     reserved | 32 | bslbf |
|     number_of_play_sequences | 16 | uimsbf |
|     for(j=0;j<number_of_play_sequence;j++) { | | |
|         number_of_play_lists | 16 | uimsbf |
|         for(k=0;k<number_of_play_lists;k++) { | | |
|             play_list_start_time_stamp_offset | 64 | uimsbf |
|             play_list(k) | | |
|         } | | |
|     } | | |
|     stuffing_bytes | 8*n | bslbf |
| } | | |

FIG. 19

| Syntax | Number of Bits | Mnemonic |
|---|---|---|
| play_list() { | | |
|     //playback sequence of play items in this play list | | |
|     number_of_play_items | 16 | uimsbf |
|     for(k=0;k<number_of_play_items;k++) { | | |
|         play_item_number | 16 | uimsbf |
|         reserved | 31 | bslbf |
|         seamless_connection_flag | 1 | bslbf |
|     } | | |
|     //play_item_table | | |
|     for(PIN=1;PIN<=number_of_play_items_in_program;PIN++) { | | |
|         play_item() | | |
|     } | | |
| } | | |

FIG. 20

| Syntax | Number of Bits | Mnemonic |
|---|---|---|
| play_item() { | | |
|     play_item_length | 32 | uimsbf |
|     play_item_type | 8 | bslbf |
|     play_mode | 8 | bslbf |
|     total_playback_time() | 32 | bcd |
|     menu_item_number | 16 | uimsbf |
|     return_item_number | 16 | uimsbf |
|     next_item_number | 16 | uimsbf |
|     prev_item_number | 16 | uimsbf |
|     if(play_item_type= "0000b" ) { | | |
|     //play item for one "cut" | | |
|         title_number | 16 | uimsbf |
|     //IN point | | |
|         item_start_time_stamp | 64 | uimsbf |
|     //OUT point | | |
|         item_end_time_stamp | 64 | uimsbf |
|     } | | |
| } | | |

FIG. 21

| Syntax | Number of Bits | Mnemonic |
|---|---|---|
| CHUNKGROUP_###.CGIT{ | | |
|     file_type_id | 8*16 | char[16] |
|     chunkgroup_time_base_flags | 32 | bslbf |
|     chunkgroup_time_base_offset | 64 | uimsbf |
|     chunk_connection_info() | | |
|     text_block() | | |
| } | | |

FIG. 22

| Syntax | Number of Bits | Mnemonic |
|---|---|---|
| chunk_connection_info() { | | |
|     chunk_connection_info_length | 32 | uimsbf |
|     reserved | 16 | bslbf |
|     number_of_chunks | 16 | uimsbf |
|     chunk_sync_play_flag | 8 | bslbf |
|     // chunk info file list | | |
|     for( i =0; i <number_of_chunks;i++) { | | |
|         chunk_arrangement_info() | | |
|     } | | |
| } | | |

FIG. 23

| Syntax | Number of Bits | Mnemonic |
|---|---|---|
| chunk_arrangement_info() { | | |
|     chunk_arrangement_info_length | 32 | uimsbf |
|     chunk_info_file_id | 16 | bslbf |
|     reserved | 5 | bslbf |
|     chunk_switch_stream_id | 16 | bslbf |
|     presentation_start_cg_time_count | 64 | uimsbf |
|     presentation_end_cg_time_count | 64 | uimsbf |
|     reserved | 4 | bslbf |
|     chunk_time_count_type | 4 | bslbf |
|     number_of_start_original_time_count_extension | 8 | uimsbf |
|     number_of_end_original_time_count_extension | 8 | uimsbf |
|     // presentation start position and time | | |
|     presentation_start_original_time_count | 64 | uimsbf |
|     presentation_end_original_time_count | 64 | uimsbf |
|     for(i=0;j<number_of_start_original_time_count_extension;j++) | | |
|         tc_ext_attributes | 16 | bslbf |
|         start_original_time_count_extension | 64 | uimsbf |
|     } | | |
|     // presentation end position and time | | |
|     for(k=0;k<number_of_end_original_time_count_extension;k++) { | | |
|         tc_ext_attributes | 16 | bslbf |
|         end_original_time_count_extension | 64 | uimsbf |
|     } | | |
|     transition_info() | | |
| } | | |

FIG. 24

| Syntax | Number of Bits | Mnemonic |
|---|---|---|
| CHUNK_%%%%.ABST{ | | |
|     file_type_id | 8*16 | char[16] |
|     info_type | 4 | bslbf |
|     reserved | 3 | bslbf |
|     cognizant_recording_indicator | 1 | bslbf |
|     //stream_info() | | |
| | | |
|     if (info_type == "MPEG2_System_TS" ) { | | |
|         number_of_programs | 8 | uimsbf |
|     else { | | |
|         number_of_programs | 8 | "0000 0001" |
|     } | | |
| | | |
|     for(i = 0; i <number_of_programs;i++) | | |
|         number_of_streams | 8 | uimsbf |
|         for (i = 0; i <number_of_streams;i++) { | | |
|             stream_identifier | 16 | bslbf |
| | | |
|             //slot type information | | |
|             reserved | 4 | bslbf |
|             slot_unit_type | 4 | bslbf |
|             if (slot_unit_type== "time_stamp" ) { | | |
|                 slot_time_length | 32 | uimsbf |
|             } else { | | |
|                 reserved | 32 | bslbf |
|             } | | |
|             number_of_slots | 32 | uimsbf |
|             number_of_thinned_out_slots | 8 | uimsbf |
| | | |
|             //stream attribute | | |
|             bitstream_attribute() | | |
|         } | | |
| | | |
|         //loop of slot information | | |
|         for (i=0;i<number_of_streams;i++) { | | |
|             slot_info() | | |
|         } | | |
|     } | | |
|     text_block() | | |
| } | | |

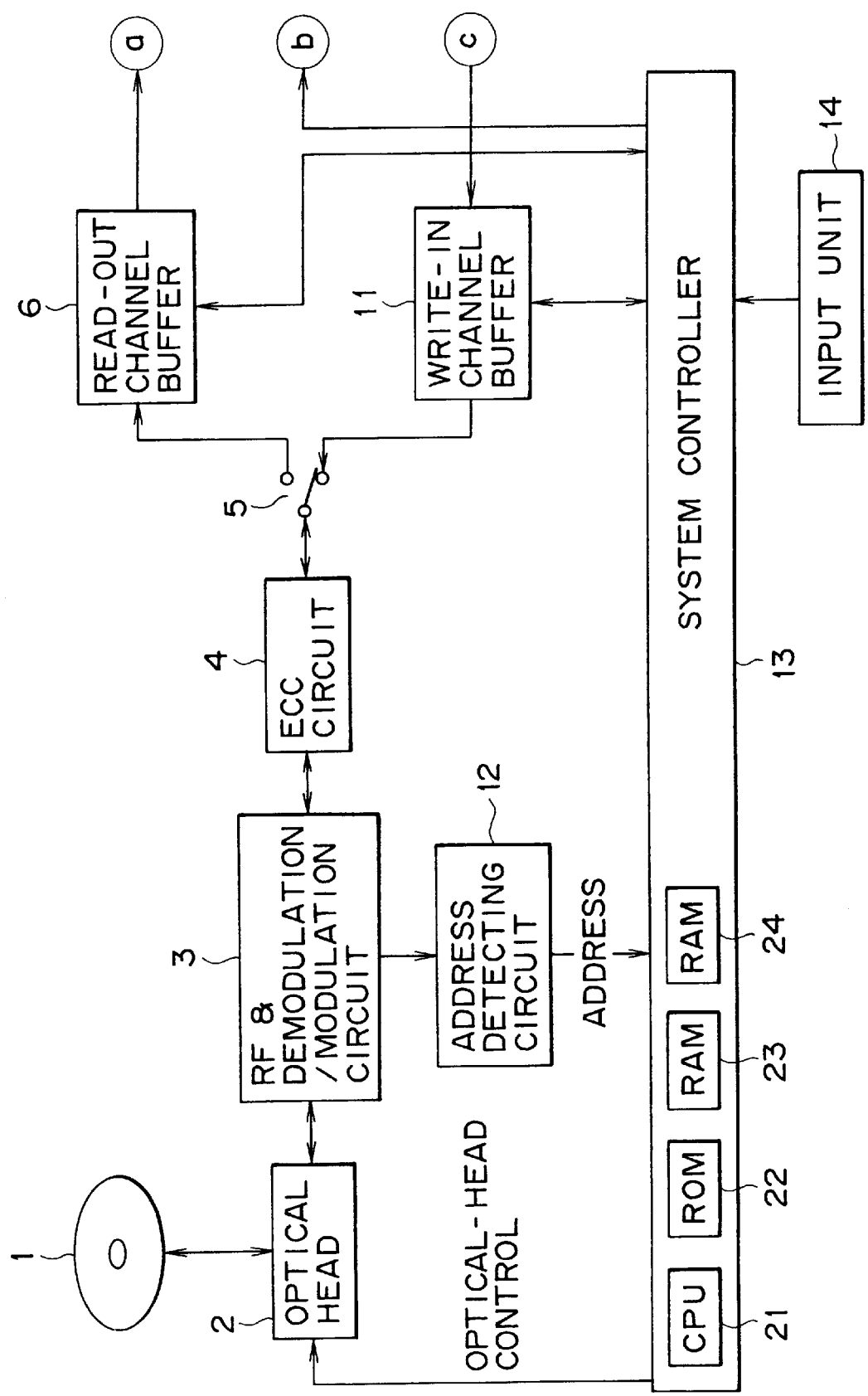

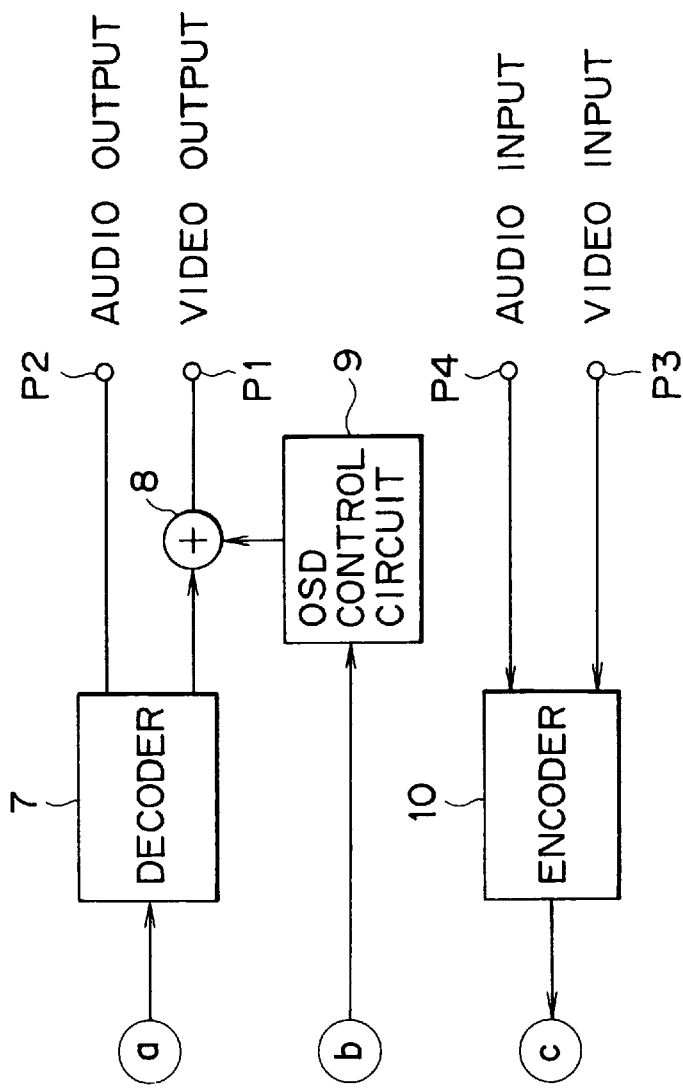
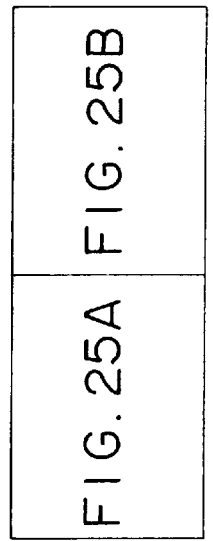

FIG.26

```
|----VOLUME.TOC
    -ALBUM.STR
    -PROGRAM
    |      -PROGRAM_001.PGI
    -TITLE
    |      -TITLE_001.VDR
    |      -TITLE_002.VDR
    |      -TITLE_003.VDR
    |
    -CHUNKGROUP
    |      -CHUNKGROUP_001.CGIT
    |      -CHUNKGROUP_002.CGIT
    |
    -CHUNK
    |      -CHUNK_0001.ABST
    |      -CHUNK_0011.ABST
    |      -CHUNK_0012.ABST
    |
    -MPEGAV
           -STREAMS_001
           |      -CHUNK_0001.MPEG2
           |
           -STREAMS_002
           |      -CHUNK_0011.MPEG2
           |      -CHUNK_0012.MPEG2
```

FIG. 29

```
/-----MPEGAV
     |     -STREAMS_003
     |     |      -CHUNK_0031.MPEG2
```

FIG. 30

```
/---VOLUME.TOC
   -ALBUM.STR
   -PROGRAM
   |     -PROGRAM_001.PGI
   -TITLE
   |     -TITLE_001.VDR
   |     -TITLE_002.VDR
   |     -TITLE_003.VDR
   |     -TITLE_004.VDR*
   |
   -CHUNKGROUP
   |     -CHUNKGROUP_001.CGIT
   |     -CHUNKGROUP_002.CGIT
   |     -CHUNKGROUP_003.CGIT*
   |
   -CHUNK
   |     -CHUNK_0001.ABST
   |     -CHUNK_0011.ABST
   |     -CHUNK_0012.ABST
   |     -CHUNK_0031.ABST*
   |
   -MPEGAV
         -STREAMS_001
         |      -CHUNK_0001.MPEG2
         |
         -STREAMS_002
         |      -CHUNK_0011.MPEG2
         |      -CHUNK_0012.MPEG2
         |
         -STREAMS_003*
         |      -CHUNK_0031.MPEG2*
         |
```

FIG. 32

```
/-----MPEGAV
    |     -STREAMS_002
    |     |      -CHUNK_0031.MPEG2
```

FIG. 33

```
/---VOLUME.TOC
   -ALBUM.STR
   -PROGRAM
   |    -PROGRAM_001.PGI
   -TITLE
   |    -TITLE_001.VDR
   |    -TITLE_002.VDR
   |    -TITLE_003.VDR
   |    -TITLE_004.VDR*
   |
   -CHUNKGROUP
   |    -CHUNKGROUP_001.CGIT
   |    -CHUNKGROUP_002.CGIT
   |
   -CHUNK
   |    -CHUNK_0001.ABST
   |    -CHUNK_0011.ABST
   |    -CHUNK_0012.ABST
   |    -CHUNK_0031.ABST*
   |
   -MPEGAV
   |    -STREAMS_001
   |    |     -CHUNK_0001.MPEG2
   |    |
   |    -STREAMS_002
   |    |     -CHUNK_0011.MPEG2
   |    |     -CHUNK_0012.MPEG2
   |    |     -CHUNK_0031.MPEG2*
   |    |
```

FIG. 36

| volume_status | Meaning |
|---|---|
| 0b | not an album member |
| 1b | album member |

FIG. 37

| chief_volume flag | Meaning |
|---|---|
| 1b | the chief volume of this album |
| 0b | not a chief volume |

FIG. 38

| album_type | Meaning |
|---|---|
| 00b | reserved |
| 01b | An album composed of one or more volumes of standalone discs |
| 10b | An album composed of one or more disc packs |
| 11b | A mixed album |

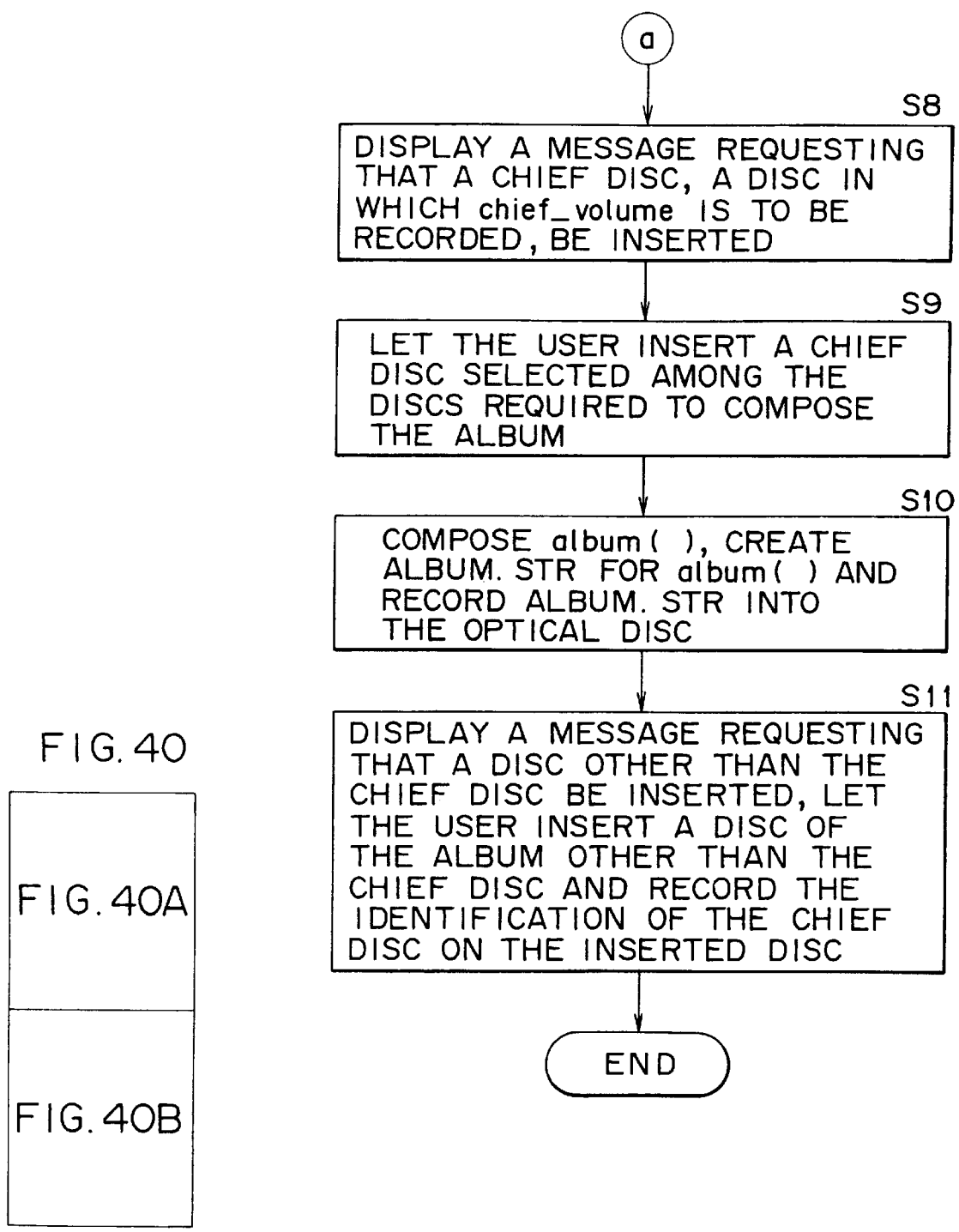

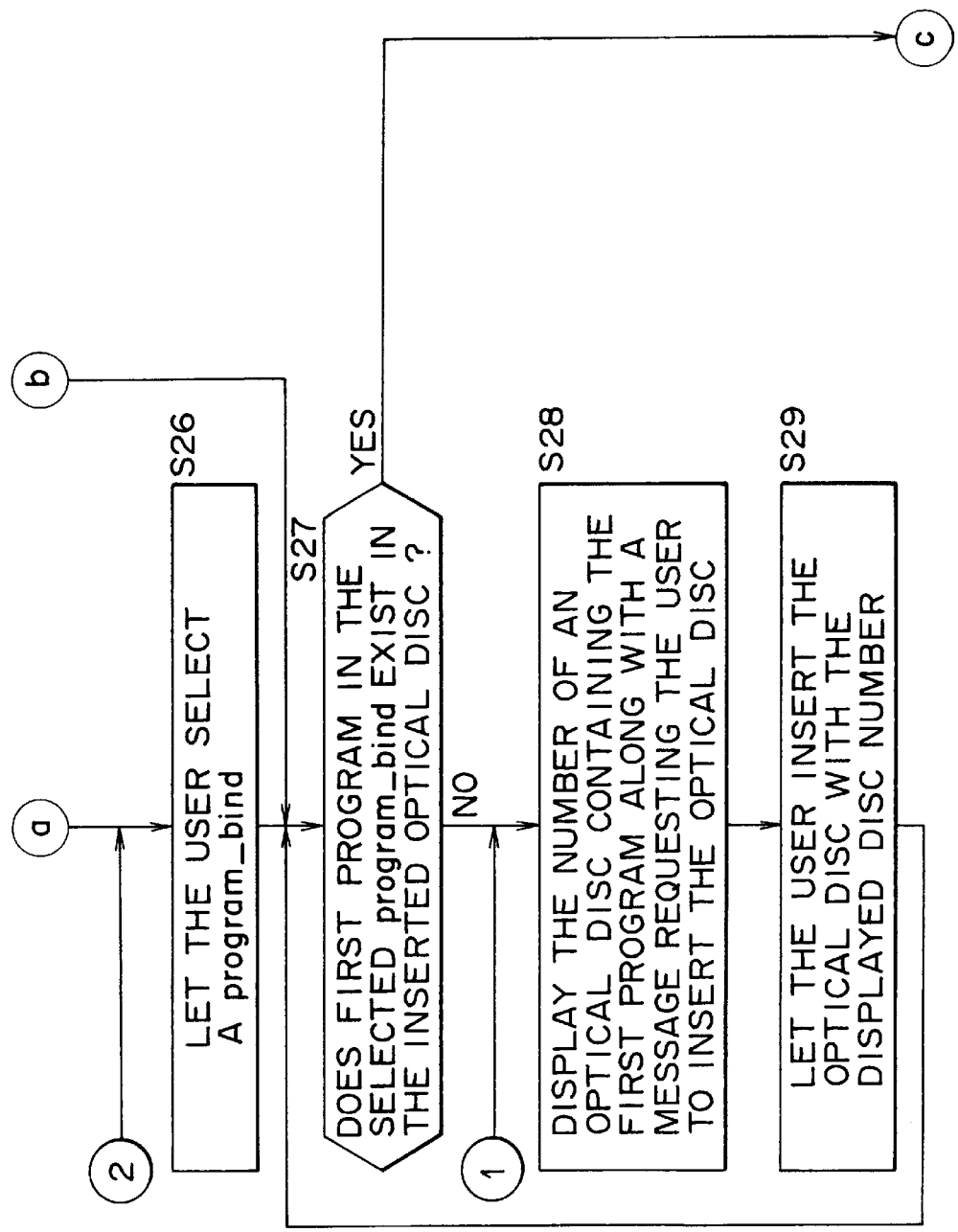

RECORDING APPARATUS, RECORDING METHOD, PLAYBACK APPARATUS, PLAYBACK METHOD, RECORDING/ PLAYBACK APPARATUS, RECORDING/ PLAYBACK METHOD, RECORDING MEDIUM AND PRESENTATION MEDIUM

BACKGROUND OF THE INVENTION

In general, the present invention relates to a recording apparatus, a recording method, a playback apparatus, a playback method, a recording/playback apparatus, a recording/playback method, a recording medium and a presentation medium. More particularly, the present invention relates to a recording apparatus, a recording method, a playback apparatus, a playback method, a recording/ playback apparatus, a recording/playback method, a recording medium and a presentation medium that allow a plurality of recording media to be handled as a unit with ease.

In the related-art optical-disc apparatus, a plurality of optical discs can be handled as a single recording medium. In this case, on each of the optical discs, control information used for handling the optical discs as a single recording medium is recorded.

In the related-art optical-disc apparatus, however, since the control information used for handling the optical discs as a single recording medium has to be recorded on each of the discs, there is raised a problem of poor operatability.

In addition, there is also raised a problem that it is impossible to let the same disc pertain to a plurality of different units.

SUMMARY OF THE INVENTION

It is thus an object of the present invention addressing the problems described above to allow a plurality of recording media to be handled as a unit with ease and to allow each of the recording media to pertain to a plurality of such units.

A recording apparatus used for recording data onto recording media according to the present invention is characterized in that the recording apparatus including:

a reading means used for reading out information from any of the recording media wherein the information includes identification information used for individually identifying each of the recording media and is required to generate associative information used for prescribing how a plurality of the recording media are associated with each other; and an associative-information recording means for generating the associative information from the information read out by the reading means and recording the associative information into one of the recording media used as a chief recording medium.

A recording method according to the present invention to be adopted in a recording apparatus used for recording data onto recording media is characterized in that the recording method including:

a reading step of reading out information from any of the recording media wherein the information includes identification information used for individually identifying each of the recording media and is required to generate associative information used for prescribing how a plurality of the recording media are associated with each other; and an associative-information recording step of generating the associative information from the information read out at the reading step and recording the associative information into one of the recording media used as a chief recording medium.

A presentation medium according to the present invention is characterized in that the presentation medium is used for presenting a program executable by a computer to drive a recording apparatus used for recording data onto recording media to carry out processing including:

a reading step of reading out information from any of the recording media wherein the information includes identification information used for individually identifying each of the recording media and is required to generate associative information used for prescribing how a plurality of the recording media are associated with each other; and an associative-information recording step of generating the associative information from the information read out at the reading step and recording the associative information into one of the recording media used as a chief recording medium.

A recording medium which data is recorded onto and played back from according to the present invention is characterized in that the recording medium is also used also for recording information which includes identification information for identifying the recording medium as an individual recording medium and is required to generate associative information used for prescribing how a plurality of recording media including the recording medium are associated with each other.

A playback apparatus for playing back data from a plurality of recording media associated with each other according to the present invention is characterized in that the playback apparatus including:

a $1^{st}$ extracting means for extracting associative information prescribing how the same plurality of the recording media are associated with each other from information played back from a recording medium of the recording media mounted on the playback apparatus;

a $2^{nd}$ extracting means which is used for extracting identification information of another recording medium of the recording media for recording the associative information in case the associative information can not be extracted by the $1^{st}$ extracting means from the information played back from the mounted recording medium; and a prompting means for urging that the other recording medium identified by the identification information extracted by the $2^{nd}$ extracting means be mounted on the playback apparatus.

A playback method according to the present invention to be adopted in a playback apparatus for playing back data from a plurality of recording media associated with each other is characterized in that the playback method including:

a $1^{st}$ extracting step of extracting associative information prescribing how the same plurality of the recording media are associated with each other from information played back from a recording medium of the recording media mounted on the playback apparatus;

a $2^{nd}$ extracting step at which identification information of another recording medium of the recording media for recording the associative information is extracted in case the associative information can not be extracted at the $1^{st}$ extracting step from the information played back from the mounted recording medium; and a prompting step of urging that the other recording medium identified by the identification information extracted at the $2^{nd}$ extracting step be mounted on the playback apparatus.

A presentation medium according to the present invention is characterized in that the presentation medium is used for presenting a program executable by a computer to drive a playback apparatus used for playing back data from a plurality of recording media associated with each other to carry out processing including:

- a $1^{st}$ extracting step of extracting associative information prescribing how the same plurality of the recording media are associated with each other from information played back from a recording medium of the recording media mounted on the playback apparatus;
- a $2^{nd}$ extracting step at which identification information of another recording medium of the recording media for recording the associative information is extracted in case the associative information can not be extracted at the $1^{st}$ extracting step from the information played back from the mounted recording medium; and
- a prompting step of urging that the other recording medium identified by the identification information extracted at the $2^{nd}$ extracting step be mounted on the playback apparatus.

A recording/playback apparatus for recording or playing back data onto or from a plurality of recording media according to the present invention is characterized in that the recording/playback apparatus including:

- a reading means used for reading out information from any of the recording media wherein the information includes identification information used for individually identifying each of the recording media and is required to generate associative information used for prescribing how the same plurality of the recording media are associated with each other;
- an associative-information recording means for generating the associative information from the information read out by the reading means and recording the associative information into one of the recording media used as a chief recording medium;
- a $1^{st}$ extracting means for extracting the associative information prescribing how the same plurality of the recording media are associated with each other from information played back from a recording medium of the recording media mounted on the recording/playback apparatus;
- a $2^{nd}$ extracting means which is used for extracting identification information of another recording medium of the recording media for recording the associative information in case the associative information can not be extracted by the $1^{st}$ extracting means from the information played back from the mounted recording medium; and
- a prompting means for urging that the other recording medium identified by the identification information extracted by the $2^{nd}$ extracting means be mounted on the recording/playback apparatus.

A recording/playback method according to the present invention to be adopted in a recording/playback apparatus for recording or playing back data onto or from a plurality of recording media is characterized in that the recording/playback apparatus method including:

- a reading step of reading out information from any of the recording media wherein the information includes identification information used for individually identifying each of the recording media and is required to generate associative information used for prescribing how the same plurality of the recording media are associated with each other;
- an associative-information recording step of generating the associative information from the information read out at the reading step and recording the associative information into one of the recording media used as a chief recording medium;
- a $1^{st}$ extracting step of extracting the associative information prescribing how the same plurality of the recording media are associated with each other from information played back from a recording medium of the recording media mounted on the recording/playback apparatus;
- a $2^{nd}$ extracting step at which identification information of another recording medium of the recording media for recording the associative information is extracted in case the associative information can not be extracted at the $1^{st}$ extracting step from the information played back from the mounted recording medium; and
- a prompting step of urging that the other recording medium identified by the identification information extracted at the $2^{nd}$ extracting step be mounted on the recording/playback apparatus.

A presentation medium according to the present invention is characterized in that the presentation medium is used for presenting a program executable by a computer to drive a recording/playback apparatus used for recording or playing back data onto or from a plurality of recording media to carry out processing including:

- a reading step of reading out information from any of the recording media wherein the information includes identification information used for individually identifying each of the recording media and is required to generate associative information used for prescribing how the same plurality of the recording media are associated with each other;
- an associative-information recording step of generating the associative information from the information read out at the reading step and recording the associative information into one of the recording media used as a chief recording medium;
- a $1^{st}$ extracting step of extracting the associative information prescribing how the same plurality of the recording media are associated with each other from information played back from a recording medium of the recording media mounted on the recording/playback apparatus;
- a $2^{nd}$ extracting step at which identification information of another recording medium of the recording media for recording the associative information is extracted in case the associative information can not be extracted at the $1^{st}$ extracting step from the information played back from the information played back from the mounted recording medium; and
- a prompting step of urging that the other recording medium identified by the identification information extracted at the $2^{nd}$ extracting step be mounted on the recording/playback apparatus.

In the recording apparatus, the recording method and the presentation medium according to the present invention, the associative information is recorded in the chief recording medium.

In the recording medium according to the present invention, there is recorded information which includes identification information for identifying the recording medium as an individual recording medium and is required to generate associative information used for prescribing how a plurality of recording media including the recording medium are associated with each other.

In the playback apparatus, the playback method and the presentation medium according to the present invention, an operation to mount a chief recording medium used for recording the associative information onto the playback apparatus is urged in case the associative information can not be extracted from information played back from a recording medium currently mounted on the playback apparatus.

In the recording/playback apparatus, the recording/playback method and the presentation medium according to the present invention, an operation to mount a chief recording medium used for recording the associative information onto the playback apparatus is urged in case the associative information can not be extracted from information played back from a recording medium currently mounted on the playback apparatus.

BRIEF DESCRIPTION OF THE DRAWINGS

Some preferred embodiments-of the present invention will be described by referring to the following diagrams wherein:

FIG. 1 is an explanatory diagram used for describing an organization of directories;

FIG. 2 is an explanatory diagram used for describing the structure of a VOLUME.TOC file;

FIG. 3 is an explanatory diagram used for describing the structure of volume_information ( );

FIG. 4 is an explanatory diagram used for describing the structure of volume_attribute ( );

FIG. 5 is an explanatory diagram used for describing the structure of resume ( );

FIG. 6 is an explanatory diagram used for describing the structure of volume_rating ( );

FIG. 7 is an explanatory diagram used for describing the structure of write_protect ( );

FIG. 8 is an explanatory diagram used for describing the structure of play_protect ( );

FIG. 9 is an explanatory diagram used for describing the structure of recording_timer ( );

FIG. 10 is an explanatory diagram used for describing the structure of text_block ( );

FIG. 11 is an explanatory diagram used for describing the structure of language_set ( );

FIG. 12 is an explanatory diagram used for describing the structure of text_item ( );

FIG. 13 is an explanatory diagram used for describing the structure of ALBUM.STR;

FIG. 14 is an explanatory diagram used for describing the structure of album ( );

FIG. 15 is an explanatory diagram used for describing the structure of TITLE_###.VDR;

FIG. 16 is an explanatory diagram used for describing the structure of title_info ( );

FIG. 17 is an explanatory diagram used for describing the structure of PROGRAM_$$$.PGI;

FIG. 18 is an explanatory diagram used for describing the structure of program ( );

FIG. 19 is an explanatory diagram used for describing the structure of play_list ( );

FIG. 20 is an explanatory diagram used for describing the structure of play_item ( );

FIG. 21 is an explanatory diagram used for describing the structure of CHUNKGROUP_###.CGIT;

FIG. 22 is an explanatory diagram used for describing the structure of chunk_connection_info ( );

FIG. 23 is an explanatory diagram used for describing the structure of chunk_arrangement_info ( );

FIG. 24 is an explanatory diagram used for describing the structure of CHUNK_%%%.ABST;

FIGS. 25A and 25B are is a diagrams showing a typical configuration of an optical-disc apparatus to which the present invention is applied;

FIG. 26 is an explanatory diagram used for describing an organization of directories;

FIG. 29 is an explanatory diagram used for describing an organization of directories;

FIG. 30 is an explanatory diagram used for describing an organization of directories;

FIG. 32 is an explanatory diagram used for describing an organization of directories;

FIG. 33 is an explanatory diagram used for describing an organization of directories;

FIG. 36 is an explanatory diagram used for describing volume_status;

FIG. 37 is an explanatory diagram used for describing chief_volume_flag;

FIG. 38 is an explanatory diagram used for describing album_type;

FIGS. 40A and 40B are flowcharts used for explaining processing to catalog an album; and FIGS. 41A, 41B and 41C are flowcharts used for explaining processing to play back an album.

DETAILED DESCRIPTION OF THE PREFERRED EMBODIMENTS

The present invention will become more apparent from a careful study of the following detailed description of some preferred embodiments with reference to accompanying diagrams. Before embodiments of the present invention are described, however, each means cited in claims of the patent in the specification is exemplified by a typical implementation appended after the means by enclosing the implementation in parentheses in the following description of characteristics of the present invention in order to clarify a relation associating the means with the implementation. It is needless to say, however, that the appended implementation is not to intended to be construed in a limiting sense, that is, examples of the means are not limited to the appended implementation.

Figure 40A:
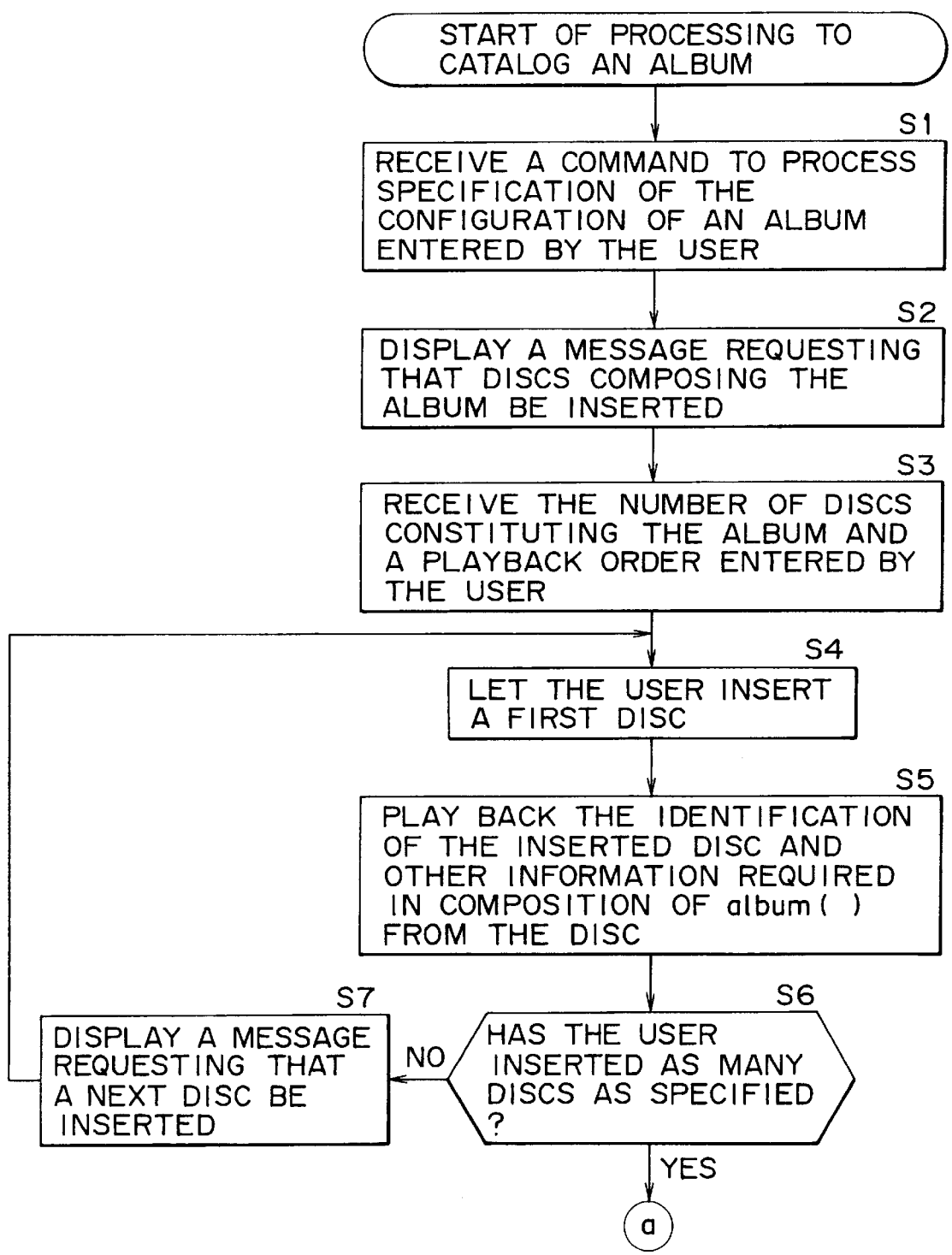

A recording apparatus used for recording data onto recording media according to claim 1 is characterized in that the recording apparatus comprises:

a reading means (implemented typically by a step S5 of a flowchart shown in FIG. 40) used for reading out information from any of the recording media wherein the information includes identification information used for individually identifying each of the recording media and is required to generate associative information (implemented typically by album ( ) shown in FIG. 14) used for prescribing how a plurality of the recording media are associated with each other; and an associative-information recording means (implemented typically by a step S10 of the flowchart shown in FIG. 40) for generating the associative information from the information read out by the reading means and recording the associative information into one of the recording media used as a chief recording medium.

According to claim 2, a recording apparatus as in claim 1 is further characterized that the recording apparatus also has an identification-information recording means (implemented typically by a step S11 of the flowchart shown in FIG. 40) for recording the identification information for identifying the chief recording medium into the recording media associated with each other as prescribed by the associative information except the chief recording medium.

Figure 41A:
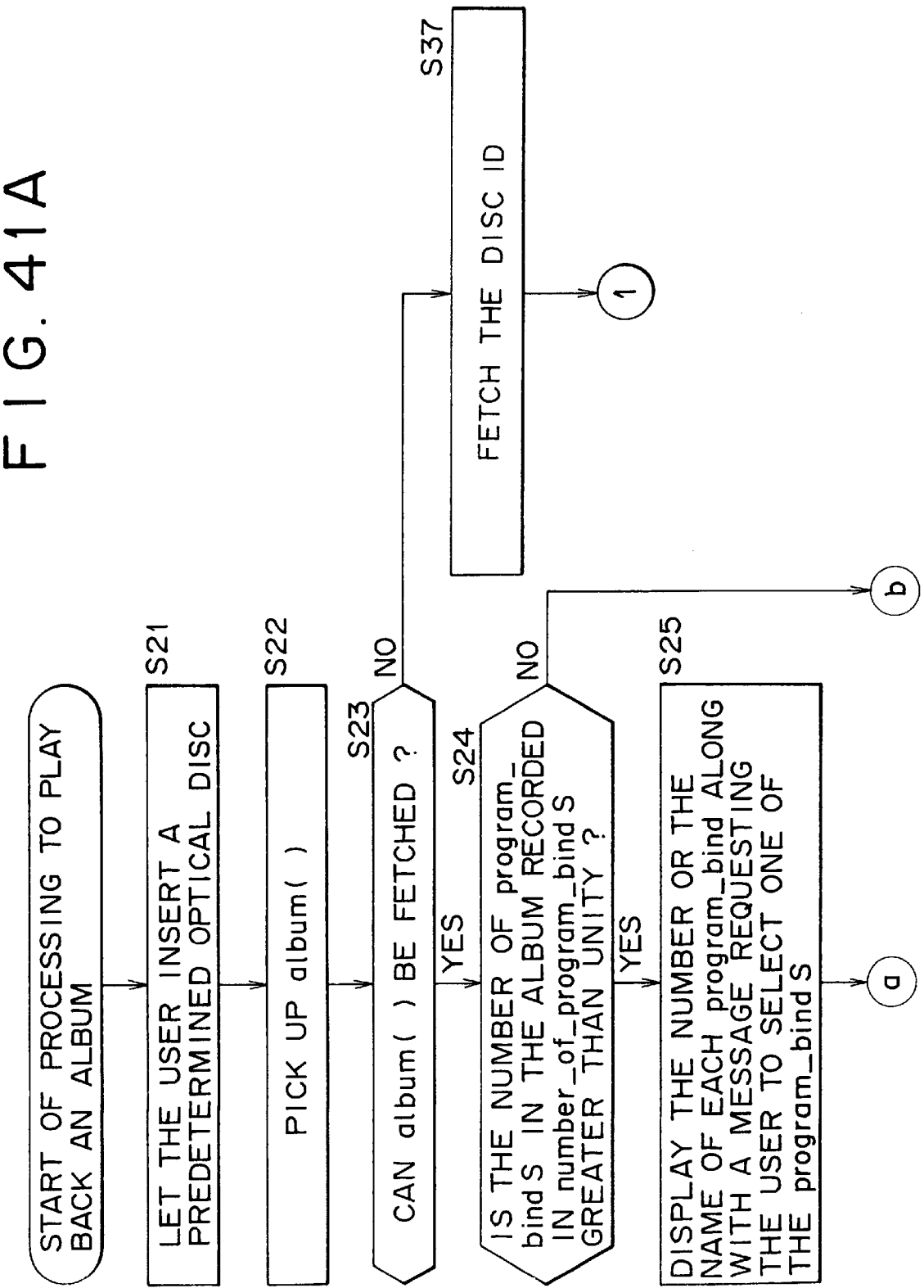
Figure 41C:
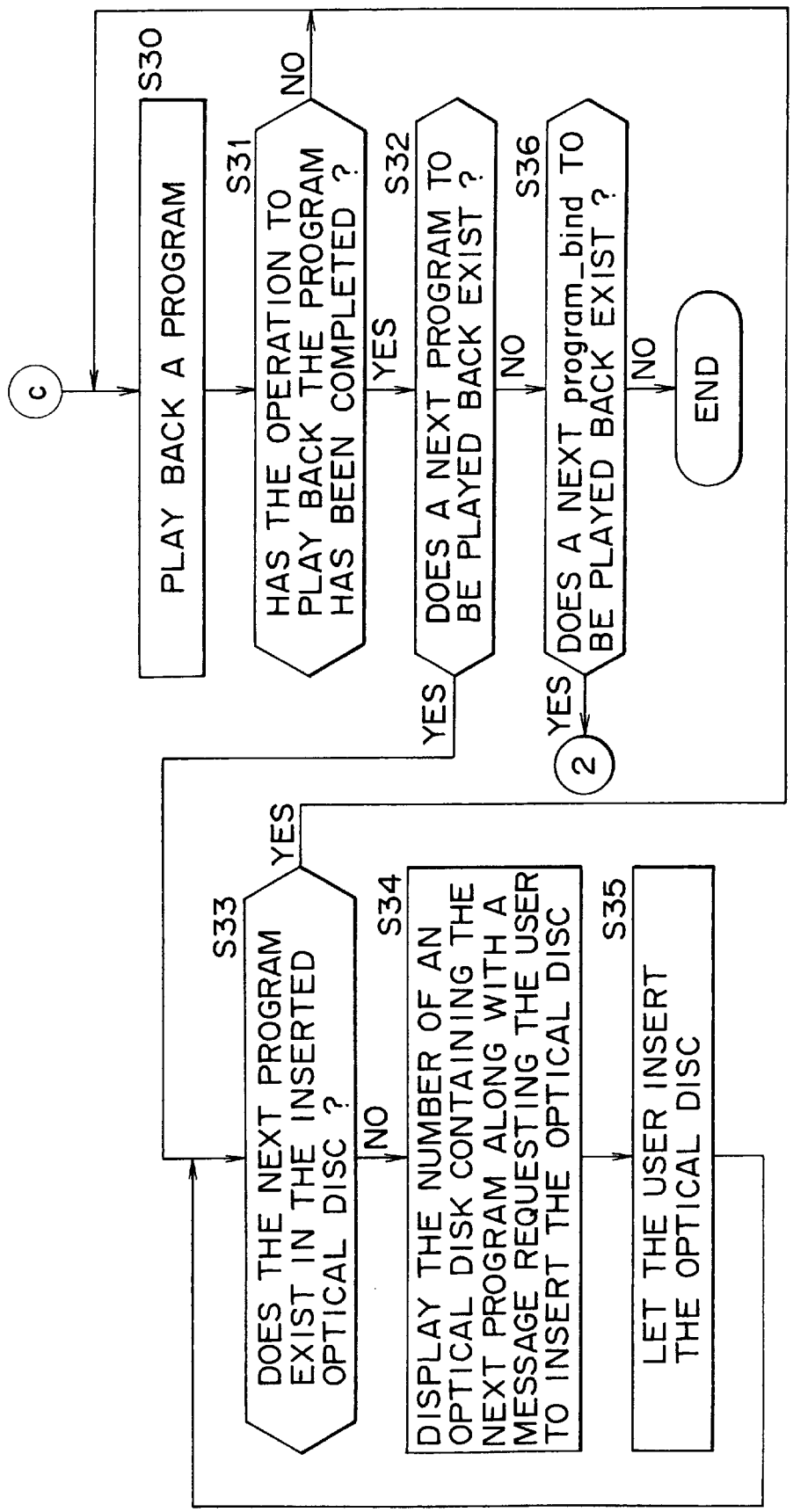

A playback apparatus for playing back data from a plurality of recording media associated with each other according to claim 8 is characterized in that the playback apparatus comprises:

a $1^{st}$ extracting means (implemented typically by a step S22 of a flowchart shown in FIG. 41) for extracting associative information prescribing how the same plurality of the recording media are associated with each other from information played back from a recording medium of the recording media mounted on the playback apparatus;

a $2^{nd}$ extracting means (implemented typically by a step S37 of the flowchart shown in FIG. 41) which is used for extracting identification information of another recording medium of the recording media for recording the associative information in case the associative information can not be extracted by the $1^{st}$ extracting means from the information played back from the mounted recording medium; and a prompting means (implemented typically by a step S28 of the flowchart shown in FIG. 41) for urging that the other recording medium identified by the identification information extracted by the $2^{nd}$ extracting means be mounted on the playback apparatus.

A recording/playback apparatus for recording or playing back data onto or from a plurality of recording media according to claim 12 is characterized in that the recording/playback apparatus comprises:

a reading means (implemented typically by the step S5 of the flowchart shown in FIG. 40) used for reading out information from any of the recording media wherein the information includes identification information used for individually identifying each of the recording media and is required to generate associative information (implemented typically by album ( ) shown in FIG. 14) used for prescribing how the same plurality of the recording media are associated with each other;

an associative-information recording means (implemented typically by the step S10 of the flowchart shown in FIG. 40) for generating the associative information from the information read out by the reading means and recording the associative information into one of the recording media used as a chief recording medium;

a $1^{st}$ extracting means (implemented typically by the step S22 of the flowchart shown in FIG. 41) for extracting the associative information prescribing how the same plurality of the recording media are associated with each other from information played back from a recording medium of the recording media mounted on the recording/playback apparatus;

a $2^{nd}$ extracting means (implemented typically by the step S37 of the flowchart shown in FIG. 41) which is used for extracting identification information of another recording medium of the recording media for recording the associative information in case the associative information can not be extracted by the $1^{st}$ extracting means from the information played back from the mounted recording medium; and a prompting means (implemented typically by the step S28 of the flowchart shown in FIG. 41) for urging that the other recording medium identified by the identification information extracted by the $2^{nd}$ extracting means be mounted on the recording/playback apparatus.

The description begins with an explanation of a layout of files on a recording medium provided by the present invention, which information is recorded into and played back from. Recorded on the recording medium, files shown in FIG. 1 are classified into 7 types listed below.

VOLUME.TOC
ALBUM.STR
PROGRAM_$$$.PGI
TITLE_###.VDR
CHUNKGROUP_@@@.CGIT
CHUNK_%%%%.ABST
CHUNK_%%%%.MPEG2

The VOLUME.TOC and ALBUM.STR files are placed in a root directory. A directory named "PROGRAM" is placed immediately below the root directory. The PROGRAM directory includes PROGRAM_$$$.PGI files where notation $$$ represents the number of a program. By the same token, a directory named TITLE is placed immediately below the root directory. The TITLE directory includes TITLE_###.VDR files where notation ### represent the number of a title. Placed immediately below the root directory, a CHUNKGROUP directory includes CHUNKGROUP_@@@.CGIT files where notation @@@ represents the number of a chunk group and a CHUNK directory includes CHUNK_%%%%.ABST files where notation %%%% represents the number of a chunk.

Also placed immediately below the root directory, an MPEGAV directory contains a plurality of sub-directories which each include CHUNK_%%%%.MPEG2 files where %%%% represents the number of a chunk.

Normally, one VOLUME.TOC file exists in the recording medium. In a recording medium with a special structure such as a recording medium with a ROM and RAM hybrid structure, however, a plurality of VOLUME.TOC files may exist. This VOLUME.TOC file is used for showing the property of the recording medium as a whole.

FIG. 2 is a diagram showing the structure of the VOLUME.TOC file. As shown in the figure, file_type_id is placed at the head of the file to indicate that the file is a VOLUME.TOC file. file_type_id is followed by volume_information ( ) which is finally followed by text_block ( ).

FIG. 3 is a diagram showing the structure of volume_information ( ). As shown in the figure, volume_information ( ) comprises volume_attribute ( ), resume ( ), volume_rating ( ), write_protect ( ), play_protect ( ) and recording_timer ( ).

volume_attribute ( ) is an area used for recording attributes of the logical volume. FIG. 4 is a diagram showing a detailed structure of volume_attribute ( ). As shown in the figure, volume_attribute ( ) includes title_playback_mode_flag and program_playback_mode_flag.

resume ( ) is an area used for recording information used in restoration of a state immediately prior to an eject operation at the time the recording medium is reinserted. FIG. 5 is a diagram showing a detailed structure of resume ( ).

volume_rating ( ) shown in FIG. 3 is an area used for recording information used in implementation of age limitation of watchers/listeners of the volume as a whole in accordance with user ages and user categories. FIG. 6 is a diagram showing a detailed structure of volume_rating ( ).

write_protect ( ) shown in FIG. 3 is an area used for recording information used in limitation of operations to change and delete a title or a program. FIG. 7 is a diagram showing a detailed structure of write_protect ( ).

play_protect ( ) shown in FIG. 3 is an area used for recording information setting a playback enable function or a playback disable function and limiting the number of playback operations for a title or a program recorded in the volume. FIG. 8 is a diagram showing a detailed structure of play_protect ( ).

recording_timer ( ) shown in FIG. 3 is an area used for recording information controlling a recording time.

FIG. 9 is a diagram showing a detailed structure of recording_timer ( ).

FIG. 10 is a diagram showing a detailed structure of text_block ( ) of the VOLUME.TOC file shown in FIG. 2. As shown in FIG. 10, text_block ( ) includes language_sets ( ) and text_items ( ). FIGS. 11 and 12 show detailed structures of language_set ( ) and text_item ( ) respectively.

Normally, one ALBUM.STR file shown in FIG. 1 exists in a recording medium. In a recording medium with a special structure such as a recording medium with a ROM and RAM hybrid structure, however, a plurality of ALBUM.STR files may exist. The ALBUM.STR file is used for combining a plurality of recording media into a configuration that makes the recording media appear as if there were only a single recording medium.

FIG. 13 is a diagram showing the structure of the ALBUM.STR file. As shown in the figure, file_type_id is placed at the head of the file to indicate that the file is ALBUM.STR. file_type_id is followed by album ( ) which is finally followed by text_block ( ).

album ( ) is an area used for recording information used in handling a plurality of volumes, that is, a plurality of recording media, as one integrated volume. FIG. 14 is a diagram showing a detailed structure of album ( ).

As many TITLE_###.VDR files shown in FIG. 1 as titles exist. A title refers to, for example, a musical selection in the case of a compact disc or a program in the case of a television broadcasting. FIG. 15 is a diagram showing the structure of a TITLE_###.VDR file. As shown in the figure, file_type_id is placed at the head of the file to indicate that the file is TITLE_###.VDR. file_type_id is followed by title_info ( ) which is finally followed by text_block ( ). Notation ### is a string of characters representing the number of a title.

title_info ( ) is an area used for recording a start point and an end point of the title on a chunk group and other attributes of the title. FIG. 16 is a diagram showing a detailed structure of title_info ( ).

As many PROGRAM_$$$.PGI files shown in FIG. 1 as programs exist. A program comprises a plurality of cuts each specifying an area of a portion or all of a title. Cuts of a program are played back in a specified order. FIG. 17 is a diagram showing the structure of a PROGRAM_$$$.PGI file. As shown in the figure, file_type_id is placed at the head of the file to indicate that the file is PROGRAM_$$$.PGI. file_type_id is followed by program ( ) which is finally followed by text_block ( ). Notation $$$ is a string of characters representing the number of a program.

program ( ) is an area used for recording information required in an operation to collect necessary portions of titles and play back them without accomplishing irreversible editing of materials. FIG. 18 is a diagram showing a detailed structure of program ( ).

program ( ) shown in FIG. 18 has one play_list. FIG. 19 is a diagram showing details of play_list ( ).

A plurality of play_items ( ) are placed in play_list. FIG. 20 is a diagram showing details of play_item ( ).

As many CHUNKGROUP_@@@.CGIT files shown in FIG. 1 as many chunk groups exist. A chunk group is a data structure used for arranging a bit stream. When the user normally operates an apparatus for recording and playing back information into and from a recording medium such as a VDR (Video Disc Recorder), the user is not aware of the existence of this file.

FIG. 21 is a diagram showing a CHUNKGROUP_@@@.CGIT file. As shown in the figure, file_type_id is placed at the head of the file to indicate that the file is CHUNKGROUP_@@@.CGIT. file_type_id is followed by chunkgroup_time_base_flags and chunkgroup_time_base_offset which are followed by chunk_connection_info ( ). Finally, chunk_connection_info ( ) is followed by text_block ( ).

chunkgroup_time_base_flags are flags each associated with a reference counter of a chunk group. chunkgroup_time_base_offset shows a start time of a reference time axis of a chunk group. chunkgroup_time_base_offset is a 32-bit value set in a counter which counts up at a frequency of 90 kHz. chunk_connection_info ( ) is an area used for recording peculiar information such as a video switch-over point, and video and audio synchronization. FIG. 22 is a diagram showing a detailed structure of chunk_connection_info ( ).

chunk_connection_info ( ) includes as many loops of chunk_arrangement_info ( ) as chunks pertaining to a chunk group. FIG. 23 is a diagram showing details of chunk_arrangement_info ( ).

As many CHUNK_%%%%.ABST files shown in FIG. 1 as many chunks exist. A chunk is information file for a stream file. FIG. 24 is a diagram showing the structure of a CHUNK_%%%%.ABST file. As shown in the figure, file_type_id is placed at the head of the file to indicate that the file is CHUNK_%%%%.ABST.

The CHUNK_%%%%.MPEG2 file shown in FIG. 1 is a stream file. Unlike other files which are generally used for storing information only, this file is used for storing an MPEG bit stream.

FIG. 25 is a diagram showing a typical configuration of an optical-disc apparatus for recording and playing back information into and from an optical disc used as a recording medium including the files described above. In the optical-disc apparatus, a single optical head 2 is provided for a rewritable optical disc 1. The optical head 2 is used for both reading out and writing information from and into the optical disc 1.

After being demodulated in an RF & demodulation/modulation circuit 3, a bit stream read out by the optical head 2 from the optical disc 1 is subjected to error correction in an ECC circuit 4 before being supplied to a read-out channel buffer 6 for absorbing a difference between a read-out rate and a decode-processing rate by way of a switch 5. An output of the read-out channel buffer 6 is supplied to a decoder 7. The read-out channel buffer 6 is designed so that a system controller 13 is capable of reading and writing the read-out channel buffer 6.

A bit stream output by the read-out channel buffer 6 is decoded by the decoder 7 which outputs video and audio signals as results of decoding. The video signal output by the decoder 7 is supplied to a synthesis circuit 8 to be synthesized therein with a video signal generated by an OSD (On Screen Display) control circuit 9. A result of the synthesis is output through an output terminal P1 to a display unit be displayed on the display unit which is not shown in the figure. In the mean time, the audio signal generated by the decoder 7 is output to a speaker through an output terminal P2 to be played back in the speaker which is also not shown in the figure.

On the other hand, a video signal input from an input terminal P3 and an audio signal input from an input terminal P4 are encoded by an encoder 10 before being supplied to a write-in channel buffer 11 for absorbing a difference between an encode-processing rate and a write-in rate. The write-in channel buffer 11 is also designed so that the system controller 13 is capable of reading and writing the write-in channel buffer 11.

Data stored in the write-in channel buffer 11 is read out from the write-in channel buffer 11 and supplied to the ECC circuit 4 by way of the switch 5. In the ECC circuit 4, an error correction code is added to the data before the data is supplied to the RF & demodulation/modulation circuit 3 to be modulated thereby. A signal, strictly speaking, an RF signal, output by the RF & demodulation/modulation circuit 3 is recorded onto the optical disc 1 by the optical head 2.

An address detecting circuit 12 detects information on an address on a track on an optical disc 1 subjected to a recording or playback operation. The system controller 13 controls operations of components composing the optical-disc apparatus. The system controller 13 comprises a CPU 21 for executing various kinds of control, a ROM unit 22 for storing information such as processing programs to be executed by the CPU 21, a RAM unit 23 for temporarily storing information such as data obtained as a result in the course of processing carried out by the CPU 21 and a RAM unit 24 for storing a variety of information files to be recorded or played back into or from the optical disc 1. The CPU 21 finely adjusts the position of the optical head 2 on the basis of a result of detection output by the address detecting circuit 12. The CPU 21 also controls switching-over operations of the switch 5. Composed of a variety of switches and a variety of buttons, an input unit 14 is operated by the user for entering a variety of commands to the optical-disc apparatus.

Next, a basic operation to read in data from an information file is explained. In an operation to read in data from the VOLUME.TOC information file, for example, the CPU 21 employed in the system controller 13 first confirms the physical address at which the VOLUME.TOC file is recorded in the optical disc 1 and the length of the file by using a file-system operation instruction included in a processing program in advance. Then, the CPU 21 moves the optical head 2 to a read-out position on the basis of information on the address of the VOLUME.TOC file. Subsequently, the CPU 21 sets the optical head 2, the RF & demodulation/modulation circuit 3 and the ECC circuit 4 in a read-out mode and positions the switch 5 on the side of the read-out channel buffer 6. Furthermore, the CPU 21 finely adjusts the position of the optical head 2 before starting a read-out operation by using the optical head 2. In the read-out operation, contents of the VOLUME.TOC file are read out by the optical head 2 and demodulated by the RF & demodulation/modulation circuit 3. The output of the RF & demodulation/modulation circuit 3 is subjected to error correction in the ECC 4 before being stored in the read-out channel buffer 6.

When the amount of data stored in the read-out channel buffer 6 becomes equal to or exceeds the size of the VOLUME.TOC file, the CPU 21 halts the read-out operation. Later on, the CPU 21 reads out the data stored in the read-out channel buffer 6 and stores the data in the RAM unit 24.

Next, a basic operation to write data into an information file is explained by taking the VOLUME.TOC information file as an example. First of all, the CPU 21 searches the file system, that is, the optical disc 1, for a free area having a size equal to or larger than a VOLUME.TOC file, into which data is to be written, and confirms the address of the free area by using a file-system operation instruction included in a processing program in advance.

Then, the CPU 21 transfers the VOLUME.TOC file prepared in the RAM unit 24 and to be newly written into the optical disc 1 to the write-in channel buffer 11. The CPU 21 then moves the optical head 2 to a write-in position on the basis of information on the address of the VOL UME.TOC file. Subsequently, the CPU 21 sets the optical head 2, the RF & demodulation/modulation circuit 3 and the ECC circuit 4 in a write-in mode and positions the switch 5 on the side of the write-in channel buffer 11. Furthermore, the CPU 21 finely adjusts the position of the optical head 2 before starting a write-in operation by using the optical head 2.

In the write-in operation, the newly prepared contents of the VOLUME.TOC file are read out from the write-in channel buffer 11 and supplied to the ECC circuit 4 by way of the switch 5. In the ECC circuit 4, an error correction code is added to the contents before modulation by the RF & demodulation/modulation circuit 3. A signal output by the RF & demodulation/modulation circuit 3 is recorded into the optical disc 1 by the optical head 2. When the amount of data read out from the write-in channel buffer 11 and recorded into the optical disc 1 becomes equal to or exceeds the size of the VOLUME.TOC file, the CPU 21 halts the write-in operation.

Finally, the CPU 21 rewrites a pointer pointing to the VOLUME.TOC file on the file system, that is, the optical disc 1, so as to make the pointer point to the newly written position by using a file-system operation instruction included in the processing program in advance.

Next, a basic operation to play back a stream is explained by taking a CHUNK_0001.MPEG2 file shown in FIG. 1 as an example. First of all, the CPU 21 employed in the system controller 13 confirms the physical address at which the CHUNK_0001.MPEG2 file is recorded in the optical disc 21 and the length of the file by using a file-system operation instruction included in a processing program in advance. Then, the CPU 21 moves the optical head 2 to a read-out position on the basis of information on the address of the CHUNK_0001.MPEG2 file. Subsequently, the CPU 21 sets the optical head 2, the RF & demodulation/modulation circuit 3 and the ECC circuit 4 in a read-out mode and positions the switch 5 on the side of the read-out channel buffer 6. Furthermore, the CPU 21 finely adjusts the position of the optical head 2 before starting a read-out operation by using the optical head 2.

In the read-out operation, contents of the CHUNK_0001.MPEG2 file read out by the optical head 2 are stored in the read-out channel buffer 6 through the RF & demodulation/modulation circuit 3, the ECC circuit 4 and the switch 5. The data stored in the read-out channel buffer 6 is output to the decoder 7 to be decoded by the decoder 7 which outputs video and audio signals as results of decoding. The audio signal generated by the decoder 7 is output to the output terminal P2. In the mean time, the video signal output by the decoder 7 is supplied to the output terminal P1 through the synthesis circuit 8.

When the amount of data read out from the optical disc 1 and decoded by the decoder 7 to be finally displayed becomes equal to the size of the CHUNK_0001.MPEG2 or when an instruction to halt the read-out operation is received from the input unit 14, the CPU 21 stops the read-out and decode processing.

Next, a basic operation to record a stream into an information file is explained by taking the CHUNK_0001.MPEG2 information file as an example. First of all, the CPU 21 searches the file system, that is, the optical disc 1, for a free area having a size equal to or larger than the CHUNK_0001.MPEG2 file, into which a stream is to be written, and confirms the address of the free area by using a file-system operation instruction included in a processing program in advance.

A video signal input from the input terminal P3 and an audio signal input from the input terminal P4 are encoded by an encoder 10 before being supplied to the write-in channel buffer 11. The CPU 21 then moves the optical head 2 to a write-in position on the basis of information on the address of the CHUNK_0001.MPEG2 file. Subsequently, the CPU 21 sets the optical head 2, the RF & demodulation/modulation circuit 3 and the ECC circuit 4 in a write-in mode and positions the switch 5 on the side of the write-in channel buffer 11. Furthermore, the CPU 21 finely adjusts the position of the optical head 2 before starting a write-in operation by using the optical head 2. In the write-in operation, the newly prepared contents of the CHUNK_0001.MPEG2 file are read out from the write-in channel buffer 11 and supplied to optical head 2 by way of the switch 5, the ECC circuit 4 and the RF & demodulation/modulation circuit 3. A signal output by the RF & demodulation/modulation circuit 3 is recorded into the optical disc 1 by the optical head 2.

When the amount of data read out from the write-in channel buffer 11 and recorded into the optical disc 1 becomes equal to the size of the CHUNK_0001.MPEG2 or when an instruction to halt the write-in operation is received from the input unit 14, the CPU 21 stops the write-in processing. Finally, the CPU 21 rewrites a pointer pointing to the CHUNK_0001.MPEG2 file on the file system, that is, the optical disc 1, so as to make the pointer point to the newly written position by using a file-system operation instruction included in the processing program in advance.

Assume that information and stream files shown in FIG. 26 have been recorded in the optical disc 1. In this example, the optical disc 1 includes a file named PROGRAM_001.PGI for storing a program. In addition, the optical disc 1 also includes three title files named TITLE_001.VDR, TITLE_002.VDR and TITLE_003.VDR respectively. Furthermore, the optical disc 1 also includes two chunk-group information files named CHUNKGROUP_001.CGIT and CHUNKGROUP_002.CGIT. On the top of that, the optical disc 1 includes three stream files named CHUNK_0001.MPEG2, CHUNK_0011.MPEG2 and CHUNK_0012.MPEG2 as well as three information files named CHUNK_0001.ABST, CHUNK_0011.ABST and CHUNK_0012.ABST associated with the CHUNK_0001.MPEG2, CHUNK_0011.MPEG2 and CHUNK_0012.MPEG2 files respectively.

Figure 27:
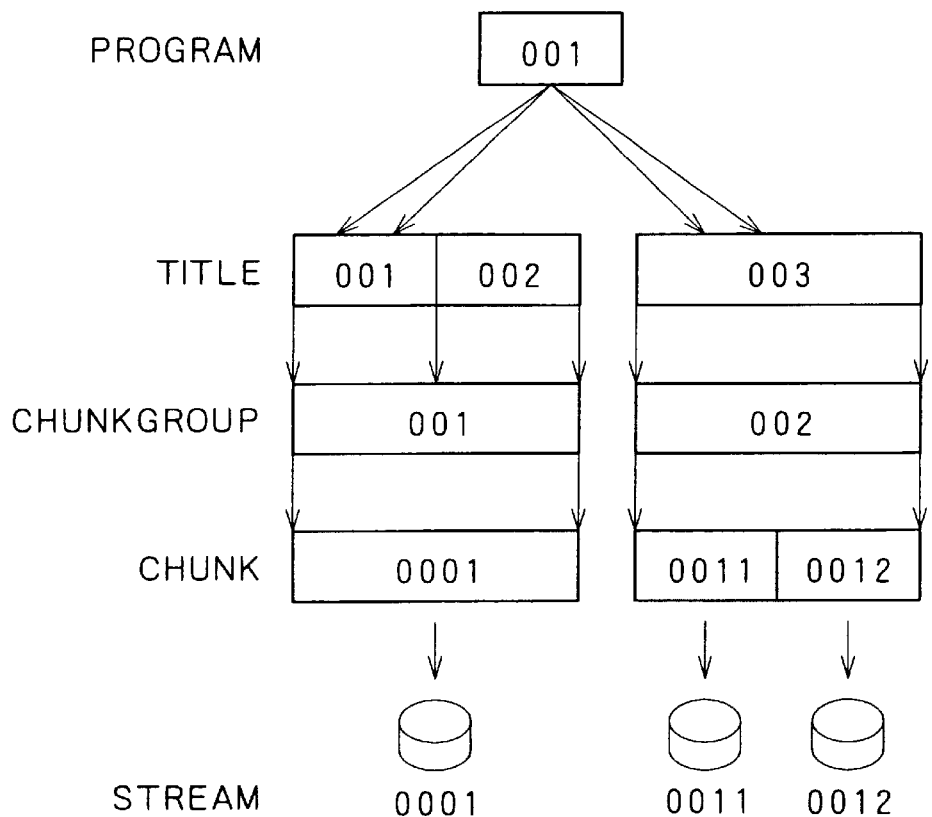
FIG. 27 is an explanatory diagram used for describing a logical organization of directories.

FIG. 27 is a diagram showing the logical structure of the optical disc 1 containing the information and stream files shown in FIG. 26. In this example, the chunk information files named CHUNK_0001.ABST, CHUNK_0011.ABST and CHUNK_0012.ABST specify the CHUNK_0001.MPEG2, CHUNK_0011.MPEG2 and CHUNK_0012.MPEG2 stream files respectively. To put it concretely, in a chunk_file_id field of each of the CHUNK_%%%%.ABST files shown in FIG. 24, the file ID of the associated stream file is specified.

In addition, in this example, the chunk-group information file named CHUNKGROUP_001.CGIT specifies the chunk information file named CHUNK_0001.ABST whereas the chunk-group information file named CHUNKGROUP_002.CGIT specifies the chunk information files named CHUNK_0011.ABST and CHUNK_0012.ABST. To put it concretely, in a chunk_info_file_id field of chunk_arrangement_info ( ) shown in FIG. 23, a file ID of chunk information is specified. This chunk_arrangement_info ( ) is included in a chunk group information file. As many chunk_arrangement_info ( ) fields as chunks pertaining to a chunk group exist in the data structure. It should be noted that chunk_arrangement_info ( ) shown in FIG. 23 is described in chunk_connection_info ( ) shown in FIG. 22 and this chunk_connection_info is described in the CHUNKGROUP_###.CGIT file shown in FIG. 21.

There is only one chunk_arrangement_info ( ) in CHUNKGROUP_001. The chunk_info file_id field of this chunk_arrangement_info ( ) specifies CHUNK_0001. On the other hand, there are two chunk_arrangement_infos ( ) in CHUNKGROUP_002. The chunk_info_file_id fields of these chunk_arrangement_infos ( ) specify CHUNK_0011 and CHUNK_0012 respectively. Thus, a chunk group can be used to specify an order in which a plurality of chunks are to be played back.

To put it concretely, first of all, an initial value of a timer for the chunk group is determined by chunkgroup_time_base_offset in the CHUNKGROUP_###.CGIT file shown in FIG. 21. Then, when each chunk is cataloged, presentation_start_cg_time_count and presentation_end_cg_time_count of chunk_arrangement_info ( ) shown in FIG. 23 are specified.

Figure 28:
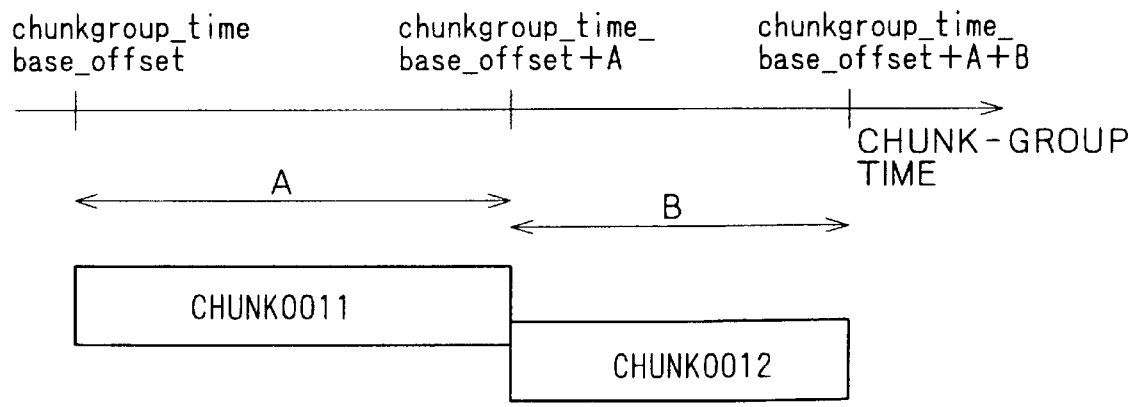
FIG. 28 is an explanatory diagram used for describing an offset.

For example, assume that the time lengths of CHUNK_0011 and CHUNK_0012 are A and B respectively as shown in FIG. 28. In this case, presentation_start_cg_count and presentation_end_cg_count of CHUNK_0011 are equal to chunkgroup_time_base_offset and chunk_group_time_base_offset+A respectively. On the other hand, presentation_start_cg_count and presentation_end_cg_count of CHUNK_0012 are equal to chunkgroup_time_base_offset+A and chunk_group_time_base_offset+A+B respectively. By setting the fields in this way CHUNKGROUP_002 is defined so that CHUNK_0011 and CHUNK_0012 are played back continuously.

It should be noted that, if the playback time of CHUNK_0011 overlaps the playback time of CHUNK_0012, one of the playback times can be shifted to eliminate the overlapping. In addition, transition_info ( ) in chunk_arrangement_info ( ) shown in FIG. 23 is used as a descriptive field for specifying a special effect such as a fade-in, a fade-out or a wipe in a transition from one stream to another one.

In the example shown in FIG. 26 (or FIG. 27), the TITLE_001.VDR and TITLE_002.VDR title information files specify the CHUNKGROUP_001.CGIT chunk-group information file whereas the TITLE_003.VDR title information file specifies the CHUNKGROUP_002.CGIT chunk-group information file. To put it concretely, a cgit_file_id field in title_info ( ) shown in FIG. 16 specifies the file ID of the chunk group. In addition, fields named title_start_chunk_group time_stamp and title_end_chunk_group_time_stamp are used for specifying a time range in which the title is defined in the chunk group.

In the example shown in FIG. 27, for example, TITLE_001 and TITLE_002 specify the first and second halves of CHUNKGROUP_001. It should be noted that the division conforms to a request made by the user and its position is determined arbitrarily by the user instead of being determined in advance. In this example, let the position of division into TITLE_001 and TITLE_002 be set at a location separated away from the head of CHUNKGROUP_001 by a distance of A.

TITLE_001 specifies CHUNKGROUP_001 as a chunk group and a start time of CHUNKGROUP_001 as a start time of the title. As an end time of the title, a time of a point specified by the user is specified.

That is to say, as title_start_chunk_group_time_stamp of TITLE_001, chunkgroup_time_base_offset (the position of the head) of CHUNKGROUP_001 is set whereas, as title_end_chunk_group_time_stamp of TITLE_001, a sum of chunkgroup_time_base_offset of CHUNKGROUP_001 and the distance A is set.

TITLE_002 specifies CHUNKGROUP_001 as a chunk group and a time of a point specified by the user is specified a start time of the title. As an end time of the title, an end time of CHUNKGROUP_001 is specified.

That is to say, as title_start_chunk_group_time_stamp of TITLE_002, a sum of chunkgroup_time_base_offset (the position of the head) of CHUNKGROUP_001 and the distance A is set whereas, as title_end_chunk_group_time_stamp of TITLE_002, a sum of chunk_group_time_base_offset of CHUNKGROUP_001 and the length of CHUNKGROUP_001 is set.

TITLE_003 specifies CHUNKGROUP_002 as a chunk group and a start time of CHUNKGROUP_002 is specified a start time of the title. As an end time of the title, an end time of CHUNKGROUP_002 is specified.

That is to say, as title_start_chunk_group_time_stamp of TITLE_003, chunkgroup_time_base_offset (the position of the head) of CHUNKGROUP_002 is set whereas, as title_end_chunk_group_time_stamp of TITLE_003, a sum of chunkgroup_time_base_offset of CHUNKGROUP_002 and the length of CHUNKGROUP_002 is set.

In addition, in this example, the program information file named PROGRAM_001.PGI specifies that part of TITLE_001 and part of TITLE_003 be played back in an order the parts are enumerated. To put it concretely, title_number in play_item ( ) shown in FIG. 20 is used for specifying a title. Times defined by a title are used for defining start and end points to extract a cut. A plurality of such cuts are gathered to compose a program.

The following is a description of an append-record operation to additionally record new information onto the optical disc 1. To put it concretely, this append-record operation is typically carried out as a video recording operation or carried out by the user by operating the input unit 14 to enter a command to perform video real-time recording to the optical-disc apparatus. In the latter case, a recording button is pressed if the video-recording end time is not known. A button for a one-touch recording function is pressed, however, for a case in which the recording end time can be predicted. The one-touch recording function is a function for carrying out video recording for a fixed period of time.

The append-record operation is explained by taking timer recording as an example. In this case, the user of the optical-disc apparatus specifies, among other things, a recording start time, a recording end time, the bit rate of a bit stream and a channel to be recorded in advance. In addition, at a point of time the video recording is reserved, the optical disc 1 is checked in advance to find out whether or not there is left a free space suited for the bit rate and the length of the recording time.

If another recording operation is carried out on the optical disc 1 between a time a reservation is made and a time to execute the reserved video recording, it is quite within the bounds of possibility that the confirmed free space for implementing the reserved video recording at the specified bit rate can not be allocated any more. In such a case, the CPU 21 either reduces the bit rate to a value smaller than the specified one in order to record information for the reserved period of time, or records information for a period of time as long as possible by keeping the bit rate unchanged as it is. It is needless to say that the CPU 21 then carries out the recording operation further and, as an inconvenience for the reserved video recording is detected, a message informing the user of the inconvenience is issued.

As the start time of the reserved video recording is approaching, the CPU 21 uses an embedded timer and a clock signal to automatically restore the optical-disc apparatus to an operating mode from a sleep mode. Then, the CPU 21 issues a file-system operation instruction included in the processing program from the beginning to allocate an area used for recording a reserved program on the optical disc 1. That is to say, first of all, the CPU 21 subtracts the start time from the end time of the reserved recording to find the length of the recording time and, then, calculates a product of the length of the recording time and the bit rate to find the size of the necessary area to be allocated for recording the reserved program. In addition to a stream file required in the reserved recording, data may need to be stored in an information file. To be more specific, when a new title needs to be stored in a title information file, an area has to be allocated on the optical disc 1 for recording the title information file. If an area with a sufficient size can not be allocated, it is necessary to adopt the countermeasure technique described above, that is, reduction of the bit rate or carrying out a recording operation only for a period of time corresponding to the allocated area.

It should be noted that, since a new title is stored in this case, the user gives a name to a new stream file, strictly speaking, to a new stream file in a new stream directory. Let the name be ¥MPEGAV¥STREAM_003¥ CHUNK_0031. That is to say, the name of the stream file is CHUNK_0031.MPEG2 in the STREAM_003 directory under the MPEGAV directory in the root directory as shown in FIG. 29.

The CPU 21 issues instructions of execution in the recording mode to other components of the optical-disc apparatus. For example, a video signal received through the input terminal P3 and an audio signal through the input terminal P4 from a tuner not shown in the figure are encoded by the encoder 10 and then stored in a write-in channel buffer 11. Then, the CPU 21 moves the optical head 2 to a write position determined by information on an address of the area allocated earlier. The CPU 21 then sets the optical head 2, the RF & demodulation/modulation circuit 3 and the ECC circuit 4 in a write-in mode and positions the switch 5 on the side of the write-in channel buffer 11. After the position of the optical head 2 has been finely adjusted, a write-in operation using the optical head 2 is started. At that time, data to be recorded in a newly provided file named CHUNK_0031.MPEG2 is read out from the write-in channel buffer 11 to be recorded onto the optical disc 1 by way of the switch 5, the ECC circuit 4, the RF & demodulation/modulation circuit 3 and the optical head 2.

When one of the following events occurs during the write-in operation described above, the CPU 21 halts the operation.
1 The end time of the reserved video recording is reached.
2 Information can no longer be recorded onto the optical disc
  1 due to a reason such as an insufficient storage capacity.
3 An instruction to stop the recording operation is received.

Next, by using a file-system operation instruction included in the processing program in advance, the CPU 21 updates a pointer pointing to CHUNK_0031.MPEG2 in the file system with a value pointing to a location at which information has been newly recorded. In addition, the CPU 21 prepares files respectively for chunk information, chunk-group information and title information, gives a name to each of the files and records the information into the files. It should be noted that free spaces for recording the files need to be allocated in advance on the optical disc 1 during the recording operation or at the reservation time.

As a result, new information files are created typically as shown in FIG. 30. In the figure, files names each with an asterisk mark '*' provided on the right side thereof are the names of the files newly created in the operation described above.

Figure 31:
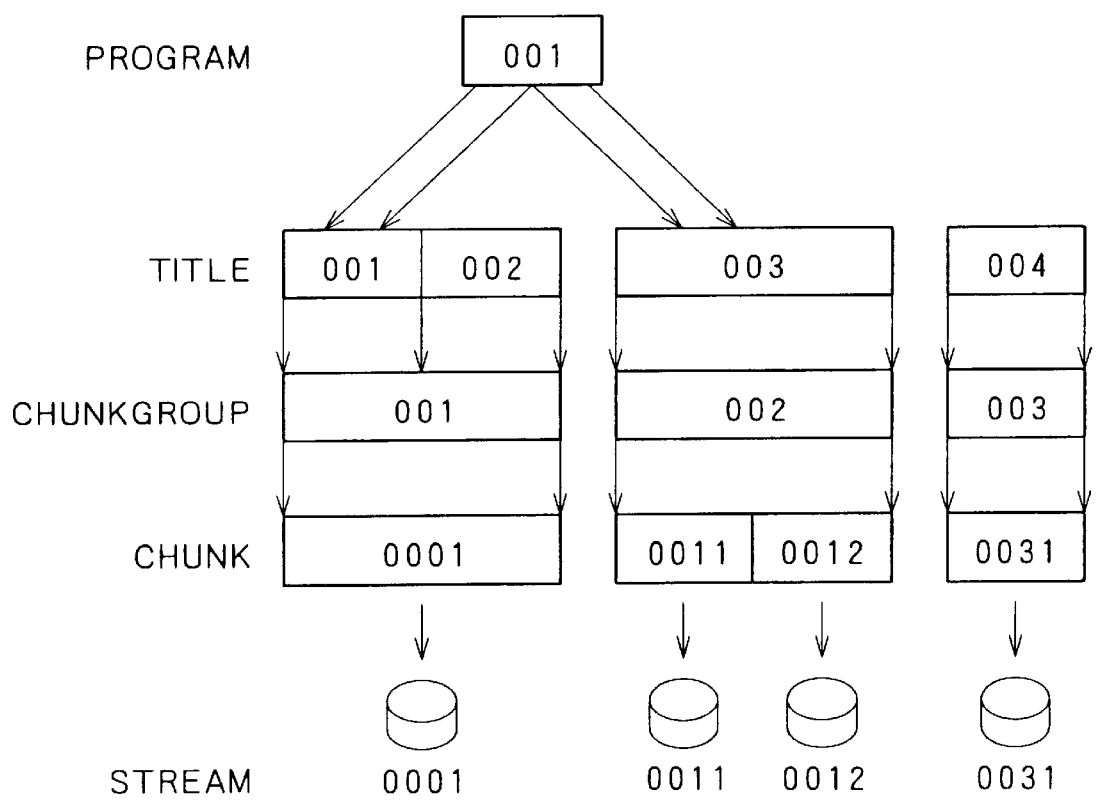
FIG. 31 is an explanatory diagram used for describing a logical organization of directories.

FIG. 31 is a diagram showing a relation among the newly created information files. As shown in the figure, TITLE_004 specifies CHUNKGROUP_003 specifying CHUNK_0031 which specifies STREAM_0031.

That is to say, a new stream is recorded in an information file as TITLE_004. By using a function of the optical-disc apparatus to verify a title, the user is capable of knowing information such as attributes of TITLE_004. In addition, TITLE_004 can be played back.

The following is a description of an operation to overwrite/record information on an optical disc 1 like one shown in FIG. 26 (or FIG. 27). Much like an operation to record a signal onto a video tape, an overwrite-record operation is an operation to record a new program over an existing program already recorded on the optical disc 1, erasing the existing program.

In the overwrite-record operation, a position to start the operation is important. Assume that the user specifies the head of TITLE_001 as a position to start an overwrite-record operation. In this case, the overwrite-record operation is carried out by overwriting existing information recorded in TITLE_001, TITLE_002 and TITLE_003 in an order they are enumerated. If the overwrite-record operation has not been finished even if the end of TITLE_003 is reached, the recording operation is continued by allocating a new free area on the optical disc 1. If TITLE_002 is specified as a location to start an overwrite-record operation, information in TITLE_001 will not be overwritten by the recording operation because TITLE_001 precedes the start location of the operation.

Assume that timer video recording is carried out by overwriting existing information starting with that at the head of TITLE_003. In this case, the user of the optical-disc apparatus specifies, among other things, a recording start time, a recording end time, the bit rate of a bit stream and a channel to be recorded in advance. In addition, the head of TITLE_003 is specified as a recording start location which is of importance to the overwrite-record operation. Furthermore, also in this case, at a point of time the video recording is reserved, the existence of a space suited for the bit rate and the video recording time on the optical disc 1 is verified in advance. In the case of an overwrite-record operation, a sum of the total size of a plurality of rewritable titles starting from a specified location and free areas on the optical disc 1 is a recordable space. To be more specific, in this case, a sum of the total size of STREAM_0011 and STREAM_0012 streams controlled by TITLE_003 and a free area on the optical disc 1 is a recordable space.

In a overwrite-record operation, for the recordable space described above, there are some items available for selection as to what order the video recording is to be actually carried out. As a first conceivable item of selection, it is possible to select a technique to record information in an order streams are specified in the title. To be more specific, in this case, it is possible to select a technique wherein the video recording is started from the head of STREAM_0011 and, as the end of STREAM_0011 is reached, the recording is continued to the head of STREAM_0012. Then, as the end of STREAM_0012 is reached, the video recording is continued to the free space on the optical disc 1. As another technique, first of all, the video recording is carried out on the free area on the optical disc 1 and, at a point of time the free area is all used up, the recording is continued to an existing stream.

The former technique is excellent in a sense that the technique emulates a video tape. That is to say, since the recording operation resembles an operation to record information onto a video tape, the operation is characterized in that the user is capable of comprehending the operation with ease. On the other hand, characterized in that an already recorded stream is erased later, the latter technique is excellent in a sense that recorded information is protected.

It should be noted that, if another recording operation is carried out on the optical disc 1 between a time a reservation is made and a time to execute the reserved video recording, it is quite within the bounds of possibility that the confirmed free space for implementing the reserved video recording at the specified bit rate can not be allocated any more. In such a case, much like the append-record operation described earlier, the CPU 21 either automatically reduces the bit rate to a value smaller than the specified one in order to record information for the reserved period of time, or records information for a period of time as long as possible by keeping the bit rate unchanged as it is.

As the start time of the reserved video recording is approaching, the optical-disc apparatus is restored from a sleep mode to an operating mode. The CPU 21 allocates all free areas on the optical disc 1. It is needless to say that there is also a method whereby a free area is not allocated at this point of time but allocated at a point of time such an area is required. For the sake of explanation simplicity, a required area is allocated prior to the start of recording.

It should be noted that since the size of a required area is known in advance in timer recording due to the fact that a start time, an end time and a bit rate are specified, only an area with a required size or a required size plus a certain additional margin can be allocated. In case it is necessary to record information files such as a case in which a title information file to be recorded as a new title is required during recording, however, an area with a size sufficient for recording the information files needs to be allocated.

A name is given to a new stream file, strictly speaking, a new stream file in a new stream directory. Let the name be ¥MPEGAV¥STREAM_002¥CHUNK_0031. That is to say, the name of the stream file is CHUNK_0031.MPEG2 in the STREAM_002 directory under the MPEGAV directory in the root directory as shown in FIG. 32.

A video signal received through the input terminal P3 and an audio signal through the input terminal P4 from a tuner not shown in the figure are encoded by the encoder 10 and then stored in a write-in channel buffer 11. Then, the CPU 21 moves the optical head 2 to a write position determined by information on an address of the area allocated earlier. The CPU 21 then sets the optical head 2, the RF & demodulation/modulation circuit 3 and the ECC circuit 4 in a write-in mode and positions the switch 5 on the side of the write-in channel buffer 11. After the position of the optical head 2 has been finely adjusted, a write-in operation using the optical head 2 is started. At that time, data to be recorded in a newly provided file named CHUNK_0031.MPEG2 is read out from the write-in channel buffer 11 to be recorded onto the optical disc 1 by way of the switch 5, the ECC circuit 4, the RF & demodulation/modulation circuit 3 and the optical head 2.

At that time, first of all, the stream file named CHUNK_0011.MPEG2 is rewritten. After the recording has reached the end of the stream file named CHUNK_0011.MPEG2, then, the operation is continued to a stream file named CHUNK_0012.MPEG2 prior to continuation to a stream file named CHUNK_0031.MPEG2.

While the processing described above is being carried out, the CPU 21 halts the write-in operation at a point of time any one of the 3 conditions described earlier is met.

Then, the CPU 21 executes a file-system operation instruction included in the processing program in advance to update the stream files, chunk information, chunk-group information and title information.

By the way, the configuration of files is changed with timing synchronized to completion of the write-in operation. For example, when recording is carried out on the stream file named CHUNK_0031.MPEG2 after the write-in operations of the 2 stream files named CHUNK_0012.MPEG2 and CHUNK_0011.MPEG2 have been completed, the configuration of files on the optical disc 1 is changed to one shown in FIG. 33. A file name with an asterisk mark '*' appended on the right side thereof is the name of a file newly created this time.

Figure 34:
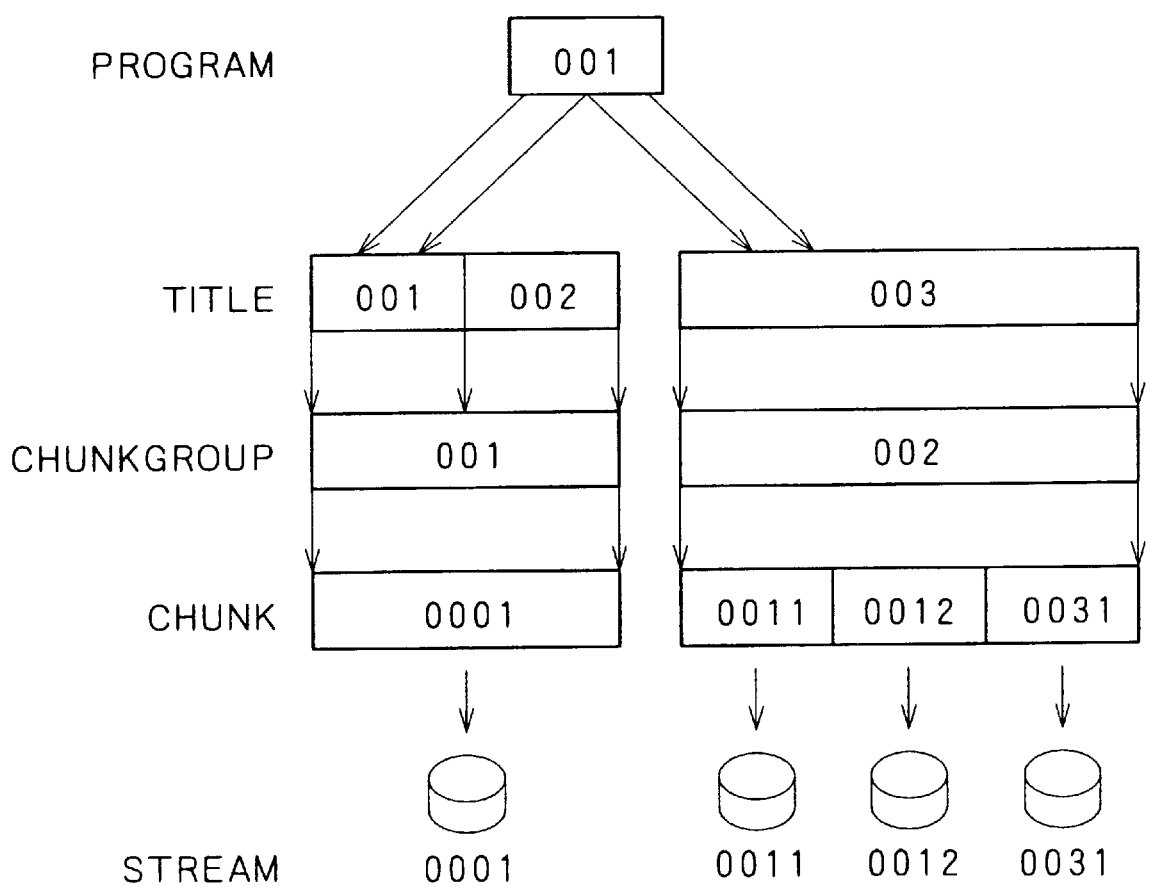
FIG. 34 is an explanatory diagram used for describing a logical organization of directories.

FIG. 34 is a diagram showing a relation of files newly created in this way, that is, files shown in FIG. 33. When compared with that shown in FIG. 31, it is obvious that CHUNK_0031 is added as a chunk included in CHUNKGROUP_002 specified by TITLE_003 and CHUNK_0031 specifies STREAM_0031.

Figure 35:
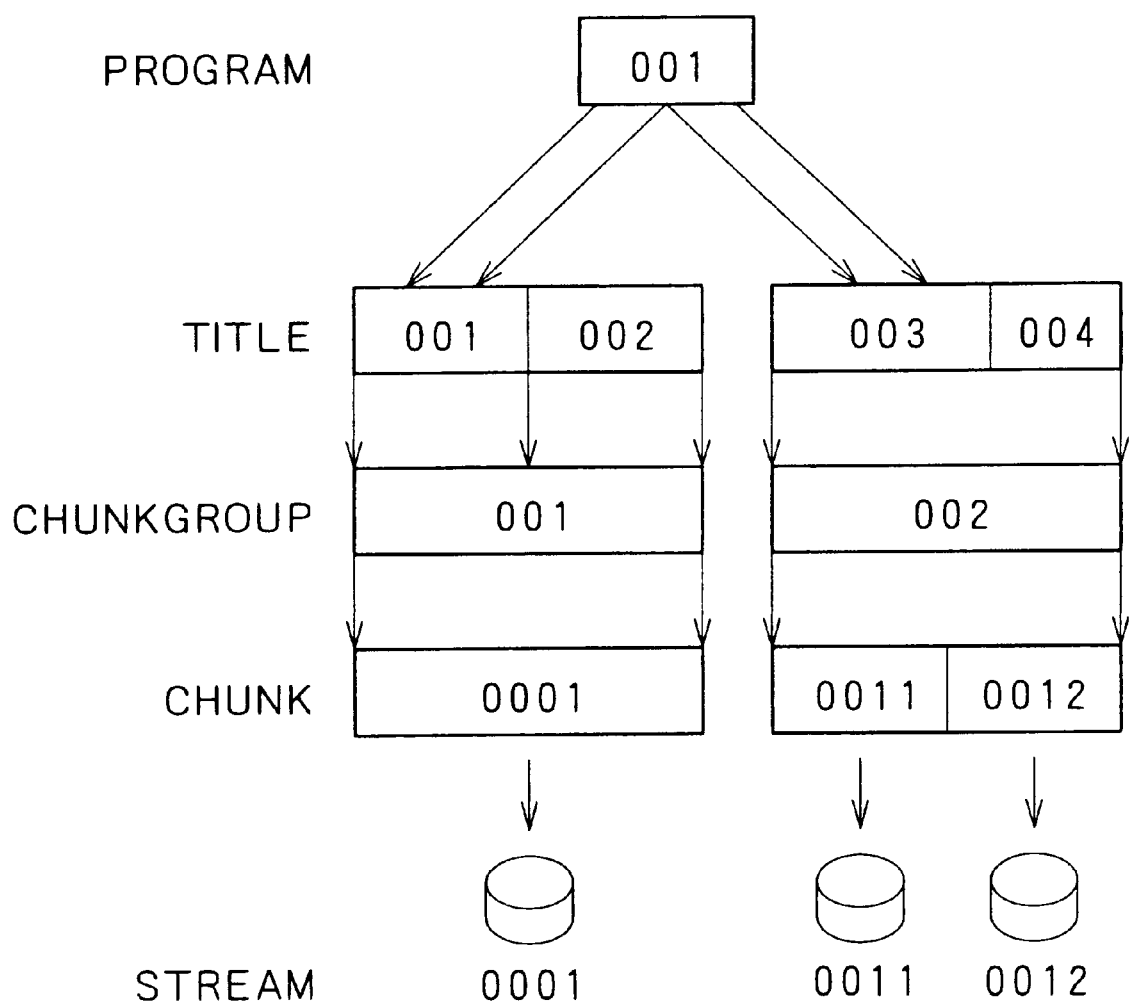
FIG. 35 is an explanatory diagram used for describing a logical organization of directories.

On the other hand, if the overwrite-record operation is completed while data is being written into an existing stream file, that is, if the overwrite-record operation is completed while data is being written into the stream file named CHUNK_0011.MPEG2 for example, the free area allocated for the overwrite operation on the stream file named CHUNK_0031.MPEG2 is released because no data is overwritten into the file. In this case, special title processing is carried out. To put it in detail, when an overwrite-record operation is started at the head of TITLE_003 and the operation is completed in the middle of it, the title is split. To be more specific, as shown in FIG. 35, new TITLE_003 is assigned to a region between the start position of the overwrite-record operation and the position of completion whereas TITLE_004 is given to an area following the region, that is, the rest of the area to which TITLE_003 is supposed to be assigned originally.

Next, an operation to play back a title is explained. Now, assume that an optical disc 1 having files shown in FIG. 26 is inserted into the optical-disc apparatus and a title is then played back from the disc 1. When the optical disc 1 is inserted into the apparatus, first of all, the CPU 21 reads out data from information files on the optical disc 1 and stores the data into the RAM unit 24. This processing is carried out by repeating the basic operation to read in data from an information file described earlier.

To be more specific, first of all, the CPU 21 reads out data from VOLUME.TOC and ALBUM.STR. Then, the CPU 21 examines the directory named TITLE to find out how many files with a name extension ".VDR" exist in the directory. A file with such a name extension is a file having title information. The number of files is equal to the number of titles. In the example shown in FIG. 26, the number of titles is three. Then, the CPU 21 reads out title information from the three files and stores the information into the RAM unit 24.

The CPU 21 controls the OSD control circuit 9 to let the OSD control circuit 9 generate character information, that is, information on titles recorded on the optical disc 1. The character information is synthesized by the synthesis circuit 8 with a video signal. A result of the synthesis is then output through the output terminal P1 to be displayed on the display unit. To be more specific, the length and attributes of each of the 3 existing titles existing in this example are displayed. The attributes include the name of the title and a date on which the title was recorded.

Assume that the user specifies TITLE_002 as a title to be played back for example. In the information file of TITLE_002, to be more specific, in the cgit_file_id field of title_info ( ) shown in FIG. 16, a file ID specifying CHUNKGROUP_001 is recorded. The CPU 21 records the file ID and stores CHUNKGROUP_001 in the RAM unit 24.

Then, the CPU 21 examines which CHUNK-the start and end times of TITLE_002 correspond to. The start and end times are recorded respectively in the title_start_chunk_group_time_stamp and title_end_chunk_group_time_stamp fields of title_info ( ) shown in FIG. 16. The examination is carried out by comparison with information included in information on a CHUNKGROUP in which their respective chunks have been recorded. To be more specific, the examination is done by comparison with information recorded in the presentation_start_cg_time_count and presentation_end_cg_time_count fields of chunk_arrangement_info ( ) shown in FIG. 23. In this example, the start time of TITLE_002 is known to be in the midst of CHUNK_0001 as shown in FIG. 27. That is to say, it is obvious that, in order to play back TITLE_002 from the head thereof, the playback operation needs to be started from the middle of the CHUNK_0001.MPEG2 stream file.

Subsequently, the CPU 21 examines the stream in order to determine which part of the stream corresponds to the head of TITLE_002. That is to say, the CPU 21 computes the magnitude of an offset time (a time stamp) in the stream corresponding to the head of TITLE_002. Next, by using characteristic-point information in the CHUNK file, a playback start point corresponding to a point immediately before the start time is identified. In this way, an offset distance of the playback start point from the head of the file can be confirmed.

Then, by using a file-system operation instruction included in the processing program in advance, the CPU 21 confirms a physical address on the optical disc 1 in which CHUNK_0001.MPEG2 has been recorded and the length thereof. Further, the offset address of the playback start point found earlier is added to this physical address to finally confirm the address of the playback start point of TITLE_002.

Subsequently, the CPU 21 moves the optical head 2 to a read-out position determined by information on the address of the CHUNK_0001.MPEG2 file. The CPU 21 then sets the optical head 2, the RF & demodulation/modulation circuit 3 and the ECC circuit 4 in a read-out mode and positions the switch 5 on the side of the read-out channel buffer 6. After the position of the optical head 2 has been finely adjusted, a read-out operation using the optical head 2 is started. At that time, data read out from the file named CHUNK_0001.MPEG2 is stored in the read-out channel buffer 6.

The data stored in the read-out channel buffer 6 is then output to the decoder 7 to be decoded thereby. As results of decoding, the decoder 7 outputs video and audio signals. At a point of time the amount of the data read out from the optical disc 1, decoded by the decoder 7 and displayed on the display unit becomes equal to the size of the CHUNK_0001.MPEG2 file, the CPU 21 makes the playback operation transit to TITLE_003. An operation to play back information from TITLE_003 is carried out in the same way as TITLE_002.

As the operation to play back data from the recorded titles is completed or as an instruction to halt the read-out operation is received, the read-out and decoding processing is terminated.

It should be noted that, when a new disc or a disc with a different format is inserted into the optical-disc apparatus as the optical disc 1, the CPU 21 makes an attempt to read out VOLUME.TOC and ALBUM.STR from the inserted disc. However, these files usually do not exist in the newly inserted disc. In such a case, that is, in case VOLUME.TOC and ALBUM.STR can not be read out, the CPU 21 issues a message to make a request for an instruction from the user. In response to the message, the user gives an instruction to the CPU 21 to eject the optical disc 1 in case the newly inserted disc has a different format, or to initialize the optical disc 1 in case the newly inserted disc is a new disc even with the same format. As an alternative, the instruction may cause data on the newly inserted disc to be recovered by using some methods in case the data has been destroyed from the disc which has the same format.

Next, an album is explained. An album means a logical unit comprising a plurality of volumes, that is, a plurality of optical discs. In many cases, only one ordinary volume exists in an optical disc. Thus, an album can be regarded as a unit comprising a plurality of optical discs.

In FIG. 14, album_length is an area used for recording the length of the album expressed in terms of bytes. volume_status is an area used for recording status of an album in which album ( ) exists as shown in FIG. 36. As shown in the figure, a value of 0 set in volume_status indicates that this optical disc 1 is not an album member, that is, this optical disc 1 is not a volume pertaining to the album. On the other hand, a value of 1 set in volume_status indicates that this optical disc 1 is an album member, that is, a volume pertaining to the album.

chief_volume_flag is an area used for recording a flag indicating whether or not this volume is a chief volume as shown in FIG. 37. As shown in the figure, a value of 1 set in chief_volume_flag indicates that this volume is a chief volume. On the other hand, a value of 0 set in chief_volume_flag indicates that this volume is not a chief volume. As will be described later, information on the configuration of an album is recorded only on the chief volume at a step S10 of a flowchart shown in FIG. 40.

As shown in FIG. 38, album_type is an area used for recording information on the configuration of the album. AS shown in the figure, a value of 01 set in album_type indicates that this album comprises 1 or more volumes of independent discs. On the other hand, a value of 10 set in album_type indicates that this album is composed of 1 or more disc packs. Finally, a value of 11 set in album_type indicates that this album is a mixed album comprising a combination of disc packs and volumes of independent discs.

album_id is an area 16 bytes in length used for recording information represented by a string of 16 characters conforming to ISO-646. The information represented by this string of characters is used to indicate whether or not discs pertain to the same album. In other words, since the information is used to identify an album, each volume or each optical disc can pertain to a plurality of different albums. disc_id and file_id are identifiers derived from a file-system layer or a physical layer while album_id is an identifier set to indicate a video layer. By recording album_id in each member volume of an album, the member volume can be checked to form a judgment as to whether or not the member volume is the chief volume of the album identified by album_id. The same information as album_name can be set in album_id.

number_of_discs_in_album is an area used for recording the number of all discs pertaining to the album. On the other hand, number_of_volumes_in_album is an area used for recording the number of all volumes pertaining to the album.

disc_id_for_album_member is an area used for recording a disc identification identifying the disc which pertains to the album. The disc identification is a copy of a value determined by the file system. On the other hand, volume_id_for_album_member is an area used for recording a volume identification identifying the volume which pertains to the album. Much like the disc identification, the volume identification is a copy of a value determined by the file system.

title_offset_number is an area used for recording an offset for obtaining a title number in the album. That is to say, by adding this offset to a title number in the volume, a title number in the album can be obtained.

Assume that, on a $1^{st}$, $2^{nd}$ and $3^{rd}$ discs, 10 titles, 20 titles and 30 titles are recorded respectively. In this case, when an album is created to include the 3 discs, the album will contain a total of 60 titles. Since the album has 60 consecutive titles, an offset of 10 is recorded in title_offset_number for the $2^{nd}$ album and an offset of 30 is set in title_offset_number for the $3^{rd}$ album.

Figure 39:
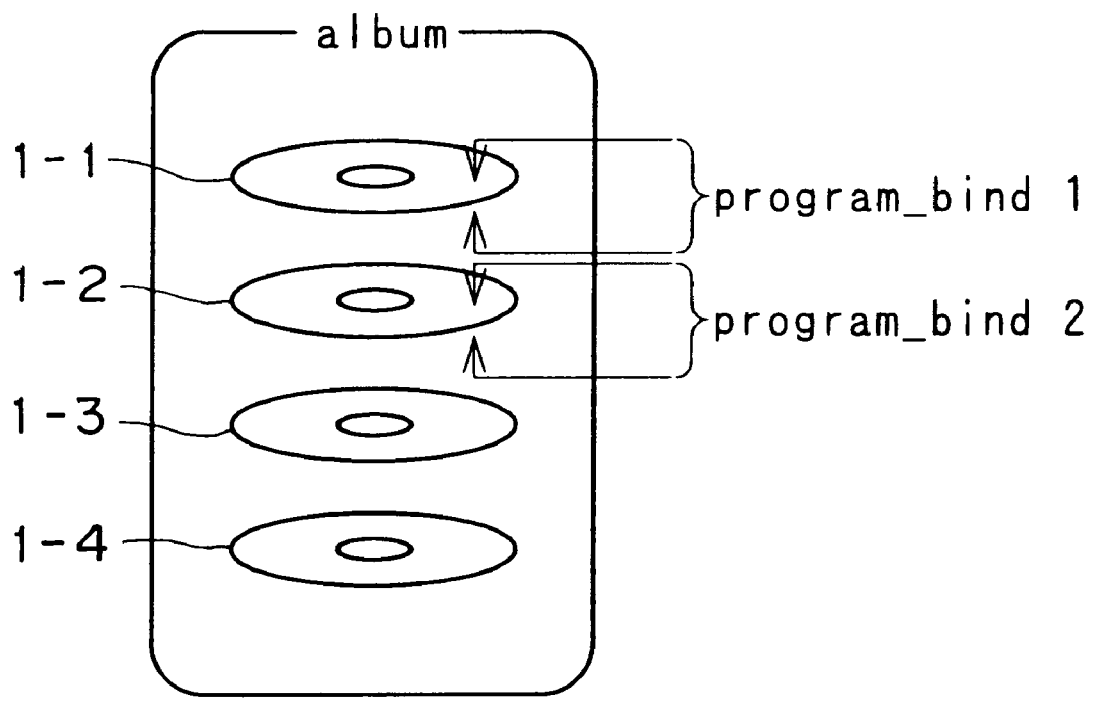
FIG. 39 is an explanatory diagram used for describing a plurality of program binds existing in an album.

Assume that only one optical-disc apparatus is available. In this case, when the 11th musical selection is played back, it is necessary to insert the $2^{nd}$ disc into the optical-disc apparatus. The optical-disc apparatus set in an album-playback mode stores the values recorded in the title_offset_number areas. When the number of a title on the $2^{nd}$ disc is displayed, the value recorded in title_offset_number for the $2^{nd}$ disc is added to the number of the title. A disc is searched for a desired title recorded thereon by using the number of the title as a key.

number_of_program_binds is an area used for recording the number of program binds in the album. An album shown in FIG. 39 comprises 4 optical discs, namely, optical discs 1-1 to 1-4. Program bind 1 is composed of optical discs 1-1 and 1-2. On the other hand, program bind 2 is composed of optical discs 1-2 and 1-4. In this case, a value of 2 is recorded in number_of_program_binds.

A program bind is a user-specified arrangement of a plurality of programs existing in an album to be played back in an order the programs are arranged. Programs in a program bind can be played back by carrying out the same operation to play back a program which is prescribed in a disc so that an album appears to the user as a volume.

number_of_programs_in_this_program_bind is an area used for recording the number of programs constituting the program bind. disc_id_for_program_bind_member is an area used for recording a disc identification of a program of the program bind. On the other hand, volume_id_for_program_bind_member is an area used for recording a volume identification of a program of the program bind. program_number_of_program_bind_member is an area used for recording the number of a program of the program bind. A program bind can not have two or more identical program numbers.

chief_disc_id is an area used for recording the identification of a disc on which the chief volume exists. In general, chief_disc_id is a copy of a value determined by a physical layer or a file-system layer. On the other hand, chief_volume_id is an area used for recording the identification of the chief volume. In general, chief_volume_id is a copy of a value determined by a physical layer or a file-system layer.

Next, processing to catalog an album is explained by referring to a flowchart shown in FIG. 40. As shown in the figure, the flowchart begins with a step S1 at which the user enters a command to process specification of the configuration of an album by operating the input unit 14. The flow of the processing then goes on to a step S2 at which the CPU 21 controls the OSD control circuit 9 to generate a message requesting that optical discs 1 composing the album be inserted. This message is output to the display unit from the synthesis circuit 8 by way of the output terminal P1 to be displayed to the user. Typically, the message having the form of a menu states: "Please, insert discs composing the album." The menu includes an input field used for entering the number of optical discs 1 constituting the album and another input field used for entering a playback order. Then, the flow of the processing proceeds to a step S3 at which, in response to the displayed menu, the user enters the number of optical discs 1 constituting the album and a playback order to the input fields by operating the input unit 14. Subsequently, the flow of the processing continues to a step S4 at which the user inserts a first optical disc 1 in the playback order among optical discs 1 constituting the album into the optical-disc apparatus.

After an optical disc 1 has been inserted into the optical-disc apparatus, the flow of the processing goes on to a step S5 at which the CPU 21 plays back the identification of the inserted optical disc 1 and other information required in composition of album ( ) from the optical disc 1. Data played back from the optical disc 1 is supplied to the read-out channel buffer 6 to be stored therein by way of the optical head 2, the RF & demodulation/modulation circuit 3, the ECC circuit 4 and the switch 5. The CPU 21 then picks up the identification of the inserted optical disc 1 and other information required in composition of album ( ) from the data stored in the read-out channel buffer 6.

The flow of the processing then proceeds to a step S6 at which the CPU 21 forms a judgment as to whether or not the user has inserted as many optical discs 1 as specified at the step S3 into the optical-disc apparatus. If as many discs 1 as required to compose an album have not all been inserted into the optical-disc apparatus yet, the flow of the processing continues to a step S7 at which the CPU 21 controls the OSD control circuit 9 to generate and display a message requesting that a next optical disc 1 be inserted. Subsequently, the flow of the processing continues to the step S4 at which the user inserts a next optical disc 1 as requested by the message. Then, the flow of the processing goes on to the step S5 at which the CPU 21 plays back the identification of the inserted optical disc 1 and other information required in composition of album ( ) from the optical disc 1.

The pieces of processing and the operations carried out by the user as described above are executed repeatedly till the outcome of the judgment formed at the step S6 indicates that as many optical discs 1 as required to compose the album have all been inserted into the optical-disc apparatus.

As the outcome of the judgment formed at the step S6 indicates that as many discs 1 as required to compose the album have all been inserted into the optical-disc apparatus, the flow of the processing continues to a step S8 at which the CPU 21 displays a message requesting that a chief disc, an optical disc 1 in which chief_volume is to be recorded, be inserted into the optical-disc apparatus. The flow of the processing then goes on to a step S9 at which, as requested by the message, the user inserts a chief disc selected among the optical discs 1 required to compose the album into the optical-disc apparatus. Then, the flow of the processing goes on to a step S10 at which the CPU 21 composes album ( ) from the data read in at the step S5 and then creates ALBUM.STR for album ( ) which is then stored temporarily in the write-in channel buffer 11. ALBUM.STR stored in the write-in channel buffer 11 is read back and supplied to the optical disc 1 to be recorded thereon by way of the switch 5, the ECC circuit 4, the RF & demodulation/modulation circuit 3 and the optical head 2.

Thus, in this embodiment, information on the configuration of an album is not recorded on all optical discs 1 composing the album, but only on the chief disc. As a result, when it is necessary to read out the identification of an optical disc 1 of an album and other information required in composition of album ( ) for example in order to change the configuration of the album, optical discs 1 constituting the album need to be inserted into the optical-disc apparatus. Since main information on the album is recorded only on the chief disc instead of on all optical discs 1 constituting the album, however, the processing is simpler.

Subsequently, the flow of the processing goes on to a step S11 at which the CPU 21 controls the OSD control circuit 9 to generate and display a message requesting that an optical disc 1 other than the chief disc be inserted into the optical-disc apparatus. When the user inserts an optical disc 1 of the album other than the chief disc into the optical-disc apparatus in response to this message, the CPU 21 records the identification of the chief disc and album_id onto the inserted optical disc 1 other than the chief disc.

Next, processing to play back an album is explained by referring to a flowchart shown in FIG. 41. As shown in the figure, the processing begins with a step S21 at which the user inserts a predetermined optical disc 1 into the optical-disc apparatus. The flow of the processing then goes on to a step S22 at which the CPU 21 controls the optical head 2 to playback data from the inserted optical disc 1. The data played back from the optical disc 1 is supplied to the read-out channel buffer 6 to be stored temporarily therein by way of the optical head 2, the RF & demodulation/modulation circuit 3, the ECC circuit 4 and the switch 5. Then, the data is transferred from the read-out channel buffer 6 to the RAM unit 24. The CPU 21 then picks up album ( ) from the data stored in the RAM unit 24.

Subsequently, the flow of the processing proceeds to a step S23 at which the CPU 21 forms a judgment as to whether or not album ( ) can be fetched at the step S22. If album ( ) is found, the optical disc 1 is judged to be the chief disc. In this case, the flow of the processing continues to a step S24 at which the CPU 21 forms a judgment as to whether or not the number of program binds in the album ( ) recorded in number_of_program binds is greater than unity. The number of program binds in the album recorded number_of_program_binds greater than unity indicates a plurality of program binds in the album. In this case, the flow of the processing goes on to a step S25 at which the CPU 21 displays the number or the name of each program bind along with a message requesting the user to select one of the program binds. The flow of the processing then proceeds to a step S26 at which the user selects a program bind to be played back among the program binds displayed along with the message and specifies the number or the name of the selected program bind by operating the input unit 14. If the outcome of the judgment formed at the step S24 indicates that the number of program binds in the album recorded number_of_program_binds is not plural, that is, if the number of program binds in the album is one, on the other hand, the steps 25 and 26 are skipped because it is not necessary for the user to select a program bind.

After completing the processing carried out at the step S26 or when the outcome of the judgment formed at the step S24 indicates that the number of program binds is one, the flow of the processing proceeds to a step S27 at which the CPU 21 forms a judgment as to whether or not the first program in the selected program bind exists in the inserted optical disc 1. If the first program in the selected program bind does not exist in the inserted optical disc 1, the flow of the processing continues to a step S28 at which the CPU 21 displays the number of an optical disc 1 containing the first program along with a message requesting the user to insert the optical disc 1 with the displayed disc number into the optical-disc apparatus. Then, the flow of the processing goes on to a step S29 at which the user inserts the optical disc 1 with the displayed disc number, that is, the optical disc 1 including the first program, into the optical-disc apparatus as requested by the message.

Subsequently, the flow of the processing goes back to the step S27 at which the CPU 21 forms a judgment as to whether or not the first program in the selected program bind exists in the inserted optical disc 1. If the first program in the selected program bind exists in the inserted optical disc 1, the flow of the processing continues to a step S30 at which the CPU 21 plays back programs in the specified order. The data played back from the optical disc 1 is supplied to the decoder 7 by way of the optical head 2, the RF & demodulation/modulation circuit 3, the ECC circuit 4, the switch 5 and the read-out channel buffer 6 in this order. The decoder 7 decodes the data supplied thereto, outputting audio data obtained as a result of decoding to the output terminal P2 and video data obtained as a result of the decoding to the output terminal P1 by way of the synthesis circuit 8.

The flow then goes on to a step S31 at which the CPU 21 forms a judgment as to whether or not the operation to play back the program has been completed. If the operation has not been completed, the playback processing of the step S30 and the formation of a judgment at the step S31 is repeated till the operation to play back the program is completed. As the outcome of the judgment formed at the step S31 indicates that the operation to play back the program has been completed, the flow of the processing proceeds to a step S32 at which the CPU 21 forms a judgment as to whether or not a next program to be played back exists. If a next program to be played back exists, the flow of the processing continues to a step S33 at which the CPU 21 forms a judgment as to whether or not the next program exists in the inserted optical disc 1. If the next program in the selected does not exist in the inserted optical disc 1, the flow of the processing continues to a step S34 at which the CPU 21 displays the number of an optical disc 1 containing the next program along with a message requesting the user to insert the optical disc 1 with the displayed disc number into the optical-disc apparatus. Then, the flow of the processing goes on to a step S35 at which the user inserts the optical disc 1 with the displayed disc number, that is, the optical disc 1 including the next program, into the optical-disc apparatus as requested by the message. Subsequently, the flow of the processing goes back to the step S33 at which the CPU 21 forms a judgment as to whether or not the next program exists in the inserted optical disc 1. If the next program in the selected program bind exists in the inserted optical disc 1, the flow of the processing goes back to the step S30 at which the CPU 21 plays back the next program.

If the outcome of the judgment formed at the step S32 indicates that a next program to be played back does not exist any more, on the other hand, the flow of the processing continues to a step S36 at which the CPU 21 forms a judgment as to whether or not a next program bind to be played back exists. If a next program bind to be played back exists, the flow of the processing goes back to the step S26 at which the CPU 21 repeats the processing of this step and the subsequent processing. If the outcome of the judgment formed at the step S36 indicates that a next program bind to be played back does not exist any more, on the other hand, the processing to play back the album is finished.

As described so far, the present invention has been exemplified by an application thereof to an optical-disc apparatus. It is worth noting, however, that the present invention can also be applied to a case in which information is recorded onto or played back from other types of recording medium.

It should be noted that, as a presentation medium for presenting computer programs to be executed to carry out the processing described above to the user, communication media such as a network and a satellite can be utilized in addition to recording media like a magnetic disc, a CD-ROM and a solid-state memory device.

In the recording apparatus, the recording method and the presentation medium according to the present invention, the associative information is recorded in the chief recording medium. As a result, processing to associate a plurality of recording media with each other becomes simpler and the operatability of the recording apparatus is improved.

In the recording medium according to the present invention, there is recorded information which includes identification information for identifying the recording medium as an individual recording medium and is required to generate associative information used for prescribing how a plurality of recording media including the recording medium are associated with each other. As a result, it is possible to provide a recording medium allowing a way in which the recording medium is associated with other recording media to be recognized with ease.

In the playback apparatus, the playback method and the presentation medium according to the present invention, an operation to mount a chief recording medium used for recording the associative information onto the playback apparatus is urged in case a recording medium currently mounted on the playback apparatus does not contain the associative information. As a result, in addition to the fact that processing to associate a plurality of recording media with each other becomes simpler, an operation to play back data from the same plurality of recording media associated with each other can be carried out.

In the recording/playback apparatus, the recording/playback method and the presentation medium according to the present invention, an operation to mount a chief recording medium used for recording the associative information onto the playback apparatus is urged in case a recording medium currently mounted on the playback apparatus does not contain the associative information. As a result, processing to associate a plurality of recording media with each other becomes simpler and the operatability of the recording/playback apparatus is improved. In addition, an operation to play back data from the same plurality of recording media associated with each other can be carried out.

What is claimed is:

1. Recording apparatus, comprising:
   a reader for reading out information from any one of plural storage media on which said information is included in a collection, said information including ID information which identifies said one medium and which is used to identify associated media on which other information included in the collection are stored; and
   an associative information recorder which generates from the read out information associative information representing the media that are associated with each other and on which said other information included in the collection are stored, the associative information recorder recording said associative information on a chief medium which is a predetermined one of said associated media.

2. The apparatus of claim 1, further comprising a chief ID recorder for recording on all of said associated media except said chief medium the ID information which identifies said chief medium.

3. The apparatus of claim 1, wherein said associative information identifies respective ones of said plural media as being included in different associations of media which store different collections of information.

4. The apparatus of claim 1, wherein said associated media comprise an album, and wherein ID information identifying the media included in said album is recorded on said chief medium in said album.

5. The apparatus of claim 4, wherein said plural media are optical disks.

6. A method of recording comprising the steps of:
   reading out information from any one of plural storage media on which said information is included in a collection, said information including ID information which identifies said one medium and which is used to identify associated media on which other information included in the collection are stored;
   generating from the read out information associative information representing the media that are associated with each other and on which said other information included in the collection are stored; and
   recording said associative information on a chief medium which is a predetermined one of said associated media.

7. The method of claim 6, further comprising the step of recording on all of said associated media except said chief medium the ID information which identifies said chief medium.

8. The method of claim 6, wherein said associative information identifies respective ones of said plural media as being included in different associations of media which store different collections of information.

9. A record medium on which is recorded a computer program for a processor to control recording apparatus by:
   reading out information from any one of plural storage media on which said information is included in a collection, said information including ID information which identifies said one medium and which is used to identify associated media on which other information included in the collection are stored;
   generating from the read out information associative information representing the media that are associated with each other and on which said other information included in the collection are stored; and
   recording said associative information on a chief medium which is a predetermined one of said associated media.

10. The record medium of claim 9, wherein said computer program further controls said recording apparatus to record on all of said associated media except said chief medium the ID information which identifies said chief medium.

11. The record medium of claim 9, wherein said associative information identifies respective ones of said plural media as being included in different associations of media which store different collections of information.

12. A record medium on which data is recorded and from which data is played back, and on which is recorded ID information that identifies said record medium and which is used to identify an association of said record medium with other record media on which information constituting a collection are recorded, said record medium having recorded thereon associative information representing the record media that are associated with each other, and on which the collection of information are recorded, if said record medium is a chief record medium.

13. The record medium of claim 12, wherein the ID information recorded thereon identifies another record medium as said chief record medium.

14. The record medium of claim 12, on which is recorded associative information that identifies said record medium as being in one of several different associations with other record media which store different collections of information.

15. The record medium of claim 12, wherein said association comprises an album and wherein the ID information identifying the record media included in said album is recorded on said chief record medium in said album.

16. The record medium of claim 12, wherein said record media are optical disks.

17. Apparatus for playing back data from a plurality of storage media which are associated with each other as a collection of information, comprising:
   first means for extracting from a medium mounted on said apparatus associative information representing the association of said media on which information included in a collection are stored;
   second means operable if said first means does not extract said associative information for extracting from said mounted medium ID information which identifies another medium on which said associative information is recorded; and
   means for prompting a user to mount on said apparatus said other medium that is identified by said ID information.

18. The apparatus of claim 17, wherein the association of said media is an album.

19. The apparatus of claim 18, wherein the associative information is recorded on a chief medium, which is a predetermined medium, and wherein said first means does not extract said associative information if said chief medium is not mounted on said apparatus.

20. The apparatus of claim 19, wherein said ID information identifies said chief medium.

21. The apparatus of claim 17, wherein said associative information represents program binds identifying arrangements of programs in a collection and the programs included in a respective program bind.

22. The apparatus of claim 1, wherein said ID information identifies the medium on which is recorded a predetermined program of a particular program bind.

23. The apparatus of claim 17, wherein said associative information identifies respective ones of said plural media as being included in different associations of media which store different collections of information.

24. A method for playing back data from a plurality of storage media which are associated with each other as a collection of information, comprising the steps of:
   extracting from a medium mounted on playback apparatus associative information representing the association of said media on which information included in a collection are stored;
   in the event said associative information is not extracted, extracting from said mounted medium ID information which identifies another medium on which said associative information is recorded; and
   prompting a user to mount on said playback apparatus said other medium that is identified by said ID information.

25. The method of claim is 24, wherein the association of said media is an album.

26. The method of claim 25, wherein the associative information is recorded on a chief medium, which is a predetermined medium, and wherein said associative information is not extracted if said chief medium is not mounted on said playback apparatus.

27. The method of claim 26, wherein said ID information identifies said chief medium.

28. The method of claim 24, wherein said associative information represents program binds identifying arrangements of programs in a collection and the programs included in a respective program bind.

29. The method of claim 28, wherein said ID information identifies the medium on which is recorded a predetermined program of a particular program bind.

30. The method of claim 24, wherein said associative information identifies respective ones of said plural media as being included in different associations of media which store different collections of information.

31. A record medium on which is recorded a computer program for a processor to control playback apparatus which is operable to play back data from a plurality of storage media which are associated with each other as a collection of information, said program controlling the steps of:
   extracting from a medium mounted on said playback apparatus associative information representing the association of said media on which information included in a collection are stored;
   in the event said associative information is not extracted, extracting from said mounted medium ID information which identifies another medium on which said associative information is recorded; and
   prompting a user to mount on said playback apparatus said other medium that is identified by said ID information.

32. The record medium of claim 31, wherein the association of said media is an album.

33. The record medium of claim 32, wherein the associative information is recorded on a chief medium, which is a predetermined medium, and wherein said associative information is not extracted if said chief medium is not mounted on said playback apparatus.

34. The record medium of claim 33, wherein said ID information identifies said chief medium.

35. The record medium of claim 31, wherein said associative information represents program binds identifying arrangements of programs in a collection and the programs included in a respective program bind.

36. The record medium of claim 35, wherein said ID information identifies the medium on which is recorded a predetermined program of a particular program bind.

37. The record medium of claim 31, wherein said associative information identifies respective ones of said plural media as being included in different associations of media which store different collections of information.

38. Apparatus for recording data on and playing data back from a plurality of storage media, comprising:
   a reader for reading out information from any one of said plural storage media on which said information is included in a collection, said information including ID information which identifies said one medium and which is used to identify associated media on which other information included in the collection are stored;
   an associative information recorder which generates from the read out information associative information representing the media that are associated with each other and on which said other information included in the collection are stored, the associative information recorder recording said associative information on a chief medium which is a predetermined one of said associated media;
   first means for extracting from a medium mounted on said apparatus said associative information;
   second means operable if said first means does not extract said associative information for extracting from said mounted medium ID information which identifies another medium on which said associative information is recorded; and
   means for prompting a user to mount on said apparatus said other medium that is identified by said ID information.

39. The apparatus of claim 38, further comprising a chief ID recorder for recording on all of said associated media except said chief medium the ID information which identifies said chief medium.

40. The apparatus of claim 38, wherein said associative information identifies respective ones of said plural media as being included in different associations of media which store different collections of information.

41. The apparatus of claim 38, wherein said associated media comprise an album, and wherein ID information identifying all of the media included in said album is recorded on said chief medium in said album.

42. The apparatus of claim 41, wherein said plural media are optical disks.

43. The apparatus of claim 38, wherein the associative information is recorded on said chief medium, and wherein said first means does not extract said associative information if said chief medium is not mounted on said apparatus.

44. The apparatus of claim 43, wherein said ID information identifies said chief medium.

45. The apparatus of claim 38, wherein said associative information represents program binds identifying arrangements of programs in a collection and the programs included in a respective program bind.

46. The apparatus of claim 45, wherein said ID information identifies the medium on which is recorded a predetermined program of a particular program bind.

47. A method for recording data on and playing data back from a plurality of storage media, comprising the steps of:

reading out information from any one of said plural storage media on which said information is included in a collection, said information including ID information which identifies said one medium and which is used to identify associated media on which other information included in the collection are stored;

generating from the read out information associative information representing the media that are associated with each other and on which said other information included in the collection are stored;

recording said associative information on a chief medium which is a predetermined one of said associated media;

extracting from a medium mounted on said apparatus said associative information;

in the event said associative information is not extracted, extracting from said mounted medium ID information which identifies another medium on which said associative information is recorded; and prompting a user to mount on said apparatus said other medium that is identified by said ID information.

48. The method of claim 47, further comprising the step of recording on all of said associated media except said chief medium the ID information which identifies said chief medium.

49. The method of claim 47, wherein said associative information identifies respective ones of said plural media as being included in different associations of media which store different collections of information.

50. The method of claim 47, wherein said associated media comprise an album, and wherein ID information identifying all of the media included in said album is recorded on said chief medium in said album.

51. The method of 50, wherein said plural media are optical disks.

52. The method of claim 47, wherein the associative information is recorded on said chief medium, and wherein said associative information is not extracted if said chief medium is not mounted on said apparatus.

53. The method of claim 52, wherein said ID information identifies said chief medium.

54. The method of claim 47, wherein said associative information represents program binds identifying arrangements of programs in a collection and the programs included in a respective program bind.

55. The method of claim 54, wherein said ID information identifies the medium on which is recorded a predetermined program of a particular program bind.

56. A record medium on which is recorded a computer program for a processor to control recording apparatus and playback apparatus, the latter being operable to play back data from a plurality of storage media which are associated with each other as a collection of information, said program controlling the steps of:

reading out information from any one of plural storage media on which said information is included in a collection, said information including ID information which identifies said one medium and which is used to identify associated media on which other information included in the collection are stored;

generating from the read out information associative information representing the media that are associated with each other and on which said other information included in the collection are stored;

recording said associative information on a chief medium which is a predetermined one of said associated media;

extracting from a medium mounted on said playback apparatus said associative information;

in the event said associative information is not extracted, extracting from said mounted medium ID information which identifies another medium on which said associative information is recorded; and prompting a user to mount on said playback apparatus said other medium that is identified by said ID information.

* * * * *